United States Patent
Kent

(10) Patent No.: US 12,053,859 B2
(45) Date of Patent: Aug. 6, 2024

(54) RELEASABLE CLAMP

(71) Applicant: BAE SYSTEMS plc, London (GB)

(72) Inventor: Lionel William John Kent, Chelmsford (GB)

(73) Assignee: BAE SYSTEMS PLC, London (GB)

( * ) Notice: Subject to any disclaimer, the term of this patent is extended or adjusted under 35 U.S.C. 154(b) by 723 days.

(21) Appl. No.: 17/277,004

(22) PCT Filed: Sep. 23, 2019

(86) PCT No.: PCT/GB2019/052658
§ 371 (c)(1),
(2) Date: Mar. 17, 2021

(87) PCT Pub. No.: WO2020/065277
PCT Pub. Date: Apr. 2, 2020

(65) Prior Publication Data
US 2022/0040818 A1 Feb. 10, 2022

(30) Foreign Application Priority Data

Sep. 24, 2018 (EP) ...................... 18275149
Sep. 24, 2018 (GB) ...................... 1815502

(51) Int. Cl.
| | | |
|---|---|---|
| B25B 1/06 | (2006.01) | |
| F16M 13/02 | (2006.01) | |
| G01T 1/02 | (2006.01) | |

(52) U.S. Cl.
CPC ............. B25B 1/06 (2013.01); F16M 13/022 (2013.01); G01T 1/02 (2013.01)

(58) Field of Classification Search
CPC ........ B23Q 1/0072; B23Q 3/102; B23Q 1/26; B33Y 40/20; B22F 10/66; B22F 12/20; Y10T 403/599; Y10T 403/60

(Continued)

(56) References Cited

U.S. PATENT DOCUMENTS 3,944,642 A * 3/1976 Uhlig ...................... B29C 49/32
264/296
5,795,534 A * 8/1998 Akutsu ................... B29C 49/18
215/398
(Continued)

FOREIGN PATENT DOCUMENTS

GB 150069 A 8/1920
GB 1427617 A 3/1976
(Continued)

OTHER PUBLICATIONS

International Preliminary Report on Patentability received for PCT Application No. PCT/GB2019/052658. Mail date: Apr. 1, 2021. 8 pages.

(Continued)

*Primary Examiner* — Steven M Cernoch
*Assistant Examiner* — Kent N Shum
(74) *Attorney, Agent, or Firm* — Finch & Maloney PLLC

(57) ABSTRACT

A releasable clamp includes: a first jaw and a second jaw, arrangeable to hold an article therebetween; a spacer, arrangeable to space apart the first and second jaws; and a set of retaining members, arrangeable to space together the first and second jaws. The first and second jaws include a first region for contacting the article, a second region defining a portion of a coupling member, a third region for contacting the spacer, and a fourth region for contacting a respective retaining member of the set of retaining members.

20 Claims, 14 Drawing Sheets

(58) Field of Classification Search
USPC .................................................... 269/37, 99
See application file for complete search history.

(56) References Cited

U.S. PATENT DOCUMENTS

| | | |
|---|---|---|
| 2005/0040661 A1 | 2/2005 | Hus |
| 2009/0051094 A1* | 2/2009 | Sandmeier ............. B27G 13/10 269/258 |
| 2010/0064762 A1* | 3/2010 | Shimota ................. B21D 37/14 72/448 |
| 2010/0116777 A1* | 5/2010 | Ishii ....................... B29B 11/14 215/381 |
| 2012/0225158 A1* | 9/2012 | Voth ....................... B29C 49/56 425/540 |
| 2015/0184896 A1 | 7/2015 | Lippert et al. |
| 2016/0128349 A1* | 5/2016 | Smith, Jr. ............. A23G 1/0096 426/515 |
| 2019/0077535 A1* | 3/2019 | Okuyama ............... B29C 49/78 |
| 2020/0247032 A1* | 8/2020 | De Cuyper ............. B29C 49/52 |

FOREIGN PATENT DOCUMENTS

| | | |
|---|---|---|
| WO | 8807434 A1 | 10/1988 |
| WO | 2020065277 A1 | 4/2020 |

OTHER PUBLICATIONS

International Search Report and Written Opinion received for PCT Application No. PCT/GB2019/052658. Mail date: Nov. 4, 2019. 12 pages.
Search Report under Section 17(5) received for GB Application No. 1815502.8, dated Mar. 22, 2019. 3 pages.
Extended European Search Report received for EP Application No. 18275149.5, dated May 22, 2019. 8 pages.

* cited by examiner

300A

200A

S1

IR2

H2
H1

1000A

Section A-A

Section A-A

Section B-B

Section C-C

- Ba-133 100 kBq (6 off)
- Eu-152 100 kBq (1 off)
- Am-241 29.6 kBq (12 off)
- Spider 1
- Spider 2 modified
- Lead shield for Am-241 sources
- Lead shield for Ba-133 and Eu-152 sources

- Am-241 29.6 kBq (12 off)
- Spider 1
- Ba-133 100 kBq (7 off)
- Spider 2

Ba-133
100 kBq
( 7 off )

Spider 2

Eu-152
100 kBq
( 1 off )

Spider 3

RELEASABLE CLAMP

FIELD

The present invention relates to releasable clamps for holding articles.

BACKGROUND TO THE INVENTION

Generally, clamps are fastening devices used to hold (i.e. secure) articles or parts thereof (also known as objects, for example devices, tools and/or workpieces) together to prevent relative movement or separation by applying compressive forces on the articles or parts thereof. Releasable (also known as temporary) clamps are typically used to hold the articles or parts thereof temporarily and include, for example, band clamps, bar clamps, bench clamps, Cardellini clamps, G-clamps, mitre clamps, pipe clamps, spring clamps and toggle clamps. Releasable clamps may be repeatedly closed to hold the articles or parts and subsequently opened. Releasable clamps typically use threaded fasteners, cams and/or springs to apply the compressive forces when closed. Non-releasable clamps (also known as permanent clamps) are typically used to hold the articles or parts thereof temporarily and include, for example, hose clamps, Marman clamps and wire rope clamps. Non-releasable clamps are typically single use, being closed to hold the articles or parts once. Non-releasable clamps typically use plastic deformation thereof to apply the compressive forces when closed. Thus, subsequently opening a closed non-releasable clamp typically results in damage thereto.

However, a problem arises when trying to hold articles or parts thereof accurately and/or precisely, for example in desired or target dispositions, in clamps, particularly releasable clamps. Further, compressive forces applied to the articles or parts may be insufficient or excessive, potentially resulting in damage thereto. In addition, specialist tools may be required to close and/or open clamps. Furthermore, repeated opening and closing of clamps may be relatively complex and/or slow.

Hence, there is a need to improve clamps, particularly releasable clamps.

SUMMARY OF THE INVENTION

It is one aim of the present invention, amongst others, to provide a releasable clamp which at least partially obviates or mitigates at least some of the disadvantages of the prior art, whether identified herein or elsewhere. For instance, it is an aim of embodiments of the invention to provide a releasable clamp that more accurately and/or precisely holds articles or parts thereof, for example in desired or target dispositions. For instance, it is an aim of embodiments of the invention to provide a releasable clamp that controls compressive forces applied to the articles or parts. For instance, it is an aim of embodiments of the invention to provide a releasable clamp that does not require a specialist tool to close and/or open. For instance, it is an aim of embodiments of the invention to provide a releasable clamp that simplifies and/or accelerates repeated opening and closing.

A first aspect provides a releasable clamp for holding an article or parts thereof, for example a device or a tool, the clamp comprising:
  a set of jaws, including a first jaw and a second jaw, arrangeable to hold the article therebetween;
  a set of spacers, including a first spacer, arrangeable to space apart respective jaws of the set of jaws; and
  a set of retaining members, including a first retaining member, arrangeable to space together respective jaws of the set of jaws;
  wherein respective jaws of the set of jaws comprise a first region for contacting the article, an optional second region defining a portion of a first part of a coupling member, a third region for contacting a respective spacer of the set of spacers and a fourth region for contacting a respective retaining member of the set of retaining members;
  wherein the clamp is configurable in:
  a first configuration, wherein the first jaw and the second jaw are mutually unjoined; and
  a second configuration, wherein the first spacer is arranged to space apart the first jaw and the second jaw and wherein the first retaining member is arranged to apply a net compressive force on the first spacer via the first jaw and the second jaw, whereby the first jaw and the second jaw are conjoined and thereby hold the article therebetween.

A second aspect provides a clamp assembly comprising:
  a releasable clamp according to the first aspect; and
  a clamp mount, comprising a corresponding second part of the coupling member;
  wherein the clamp assembly is arrangeable in:
  a first arrangement, wherein the clamp and the clamp mount are mutually uncoupled; and
  a second arrangement, wherein respective portions of the first part of the coupling member of the set of jaws are coupled with the corresponding second part of the coupling member, when the clamp is configured in the second configuration.

A third aspect provides an article for holding in a releasable clamp according to the first aspect, wherein the article comprises a source of ionizing radiation.

A fourth aspect provides an assembly comprising a clamp assembly according to the second aspect and a set of articles, including a first article, according to the third aspect.

A fifth aspect provides a method of holding an article or parts thereof according to the third aspect in a releasable clamp according to the first aspect, optionally in a clamp assembly according to the second aspect.

A sixth aspect provides a radiation backscatter detector comprising a releasable clamp according to the first aspect, a clamp assembly according to the second aspect, an article according to the third aspect and/or an assembly according to the fourth aspect.

DETAILED DESCRIPTION OF THE INVENTION

According to the present invention there is provided a releasable clamp for holding an article or parts thereof, as set forth in the appended claims. Also provided is a clamp assembly comprising a releasable clamp, an article for holding in a releasable clamp and an assembly comprising a clamp assembly and an article. Other features of the invention will be apparent from the dependent claims, and the description that follows.

Releasable Clamp

The first aspect provides a releasable clamp for holding an article or parts thereof, for example a device or a tool, the clamp comprising:
  a set of jaws, including a first jaw and a second jaw, arrangeable to hold the article therebetween;
  a set of spacers, including a first spacer, arrangeable to space apart respective jaws of the set of jaws; and a set of retaining members, including a first retaining member, arrangeable to space together respective jaws of the set of jaws;

wherein respective jaws of the set of jaws comprise a first region for contacting the article, an optional second region defining a portion of a first part of a coupling member, a third region for contacting a respective spacer of the set of spacers and a fourth region for contacting a respective retaining member of the set of retaining members;

wherein the clamp is configurable in:

a first configuration, wherein the first jaw and the second jaw are mutually unjoined; and a second configuration, wherein the first spacer is arranged to space apart the first jaw and the second jaw and wherein the first retaining member is arranged to apply a net compressive force on the first spacer via the first jaw and the second jaw, whereby the first jaw and the second jaw are conjoined and thereby hold the article therebetween.

In this way, the releasable clamp more accurately and/or precisely holds articles or parts thereof, for example in desired or target dispositions since the spacers and the retaining members act cooperatively in opposition via jaws that hold the articles or parts thereof therebetween and since these are designed thus, the articles are held reproducibly. In this way, the releasable clamp controls compressive forces applied to the articles or parts since the spacers limit the forces the forces applied thereon. In this way, the releasable clamp does not require a specialist tool to close and/or open. In this way, the releasable clamp simplifies and/or accelerates repeated opening and closing.

The releasable clamp is for holding (i.e. securing, maintaining in a certain position) an article or parts thereof, for example a device, a workpiece or a tool, as described below in more detail. In one example, the releasable clamp is for holding the article or parts thereof accurately and/or precisely, for example in a desired or target disposition. For example, the releasable clamp may hold parts of the article in a predetermined relative arrangement and/or predetermined relative positions. In one example, the releasable clamp is specifically designed (i.e. customized, bespoke) for holding a specific article or parts thereof. It should be understood that the releasable clamp may be repeatedly closed to hold the articles or parts and subsequently opened. It should be understood that references herein to the article include references to the parts thereof, mutatis mutandis, for brevity.

Jaws

The releasable clamp comprises the set of jaws, including the first jaw and the second jaw, arrangeable to hold the article therebetween. As described below in more detail, the first jaw and the second jaw each comprise the first region for contacting the article such that the article is held between and in contact with the respective first regions of the first jaw and the second jaw. In one example, the set of jaws includes J jaws, where J is a natural number greater than or equal to 2, for example 2, 3, 4, 5, 6, 7, 8, 9, 10 jaws or more, preferably 2, 3, 4, 5 or 6 jaws, more preferably 2, 3 or 4 jaws, most preferably 2 jaws (i.e. the first jaw and the second jaw). In one example, the set of jaws includes only 2 jaws (i.e. the first jaw and the second jaw). A relatively larger number of jaws, for example 5 or more, may enhance holding of the article since a relatively larger number of first regions are in contact at different positions with the article, thereby applying forces relatively more uniformly to the article. A relatively smaller number of jaws, for example 4 or fewer, may enhance simplicity of a design of the releasable clamp and/or facilitate opening and/or closing of the jaws. In one example, the first jaw and the second jaw are similar, for example the same (i.e. identical). In this way, the first jaw and the second jaw are interchangeable. In one example, the set of jaws includes J jaws, wherein the J jaws are similar, for example the same (i.e. identical). In one example, the first jaw and the second jaw are mutually paired. For example, the first jaw and the second jaw may be similar, for example the same (i.e. identical). Alternatively and/or additionally, the first jaw and the second jaw may be mutual mirror images. Alternatively, the first jaw and the second jaw may be complementary, for example as provided by dividing a jaw precursor into the first jaw and the second jaw. In one example, the first jaw and the second jaw are linked, for example flexibly or moveable connected by a chain, a cable or a joint. In this way, configuring the releasable clamp in the second configuration may be facilitated while the first jaw and the second jaw are more conveniently stored in the first configuration.

Spacers

The releasable clamp comprises the set of spacers, including the first spacer, arrangeable to space apart respective jaws of the set of jaws. It should be understood that the spacers of the set of spacers thus define respective spacings, for example minimum spacings, between the respective jaws of the set of jaws. As described below in more detail, the first jaw and the second jaw each comprise the third region for contacting the respective spacer of the set of spacers. In one example, the first spacer defines a first spacing between the first jaw and the second jaw. In one example, the set of spacers includes S spacers, where S is a natural number greater than or equal to 1, for example 1, 2, 3, 4, 5, 6, 7, 8, 9 or more spacers, preferably 1, 2, 3, 4 or 5 spacers, more preferably 1, 2 or 3 spacers, most preferably 1 spacer (i.e. the first spacer). In one example, the set of spacers includes S spacers, where S=J−1. In one example, the set of spacers includes only 1 spacer (i.e. the first spacer). In this way, configuring the releasable clamp in the second configuration may be facilitated since the releasable clamp includes fewer components.

In one example, the first spacer comprises and/or is a parallel-sided spacer, for example a parallel key, or a tapered spacer, for example a tapered key and wherein respective third regions are correspondingly shaped. For example, if the first spacer comprises and/or is a parallel-sided spacer, the respective third regions of the first jaw and the second jaw may be planar and arranged to be mutually parallel in the second configuration. If the first spacer comprises and/or is a parallel-sided spacer, a first spacing between the first jaw and the second jaw is defined by a width, for example, of the first spacer, independent of a length of insertion of the first spacer between the first jaw and the second jaw. Hence, the net compressive force on the first spacer is independent of the length of insertion of the first spacer between the first jaw and the second jaw. If the first spacer comprises and/or is a tapered spacer, a first spacing between the first jaw and the second jaw is defined by widths, for example, of the first spacer and dependent (i.e. directly proportional) on a length of insertion of the first spacer between the first jaw and the second jaw. Hence, the net compressive force on the first spacer is dependent (i.e. directly proportional) on the length of insertion of the first spacer between the first jaw and the second jaw. A parallel-sided spacer may be preferred, thereby more accurately and/or precisely holds articles or parts thereof, for example in desired or target dispositions and/or more repeatedly controlling compressive forces applied to the articles or parts thereof. Alternatively, a tapered spacer provides variable control on the compressive forces applied to the articles or parts thereof.

In one example, the first spacer comprises and/or is a resiliently-biased spacer. For example, the first spacer may comprise a mechanical spring, such as a compression or a tension spring, formed at least in part from a spring metal, a polymeric material and/or an elastomeric material. In this way, the first spacer may be arranged to apply a net tensile force on the first retaining member via the first jaw and the second jaw.

Retaining Members

The releasable clamp comprises the set of retaining members, including the first retaining member, arrangeable to space together respective jaws of the set of jaws. That is, while the set of spacers, including the first spacer, are arrangeable to space apart respective jaws of the set of jaws, the set of retaining members, including the first retaining member, are arrangeable in contrast to space together respective jaws of the set of jaws, via contacting the fourth regions of the respective jaws of the set of jaws. It should be understood that the retaining members of the set of retaining members thus define respective spacings, for example maximum spacings, between the respective jaws of the set of jaws. That is, while the retaining members and the spacers act in opposition, the retaining members and the spacers are complementary. In one example, the set of retaining members includes R spacers, where R is a natural number greater than or equal to 1, for example 1, 2, 3, 4, 5, 6, 7, 8, 9 or more retaining members, preferably 1, 2, 3, 4 or 5 retaining members, more preferably 1, 2 or 3 retaining members, most preferably 1 retaining members (i.e. the first retaining member). In one example, the set of spacers includes only 1 retaining members (i.e. the first retaining members). In this way, configuring the releasable clamp in the second configuration may be facilitated since the releasable clamp includes fewer components.

In one example, the first retaining member is arranged to interlock around the first jaw and the second jaw. In this way, the first retaining member may engage with the first jaw and the second jaw, for example by overlapping and/or by fitting together of complementary projections and recesses thereon, thereby maintaining the releasable clamp in the second configuration.

In one example, the first retaining member comprises and/or is a resiliently-biased retaining member. For example, the first retaining member may comprise a mechanical spring, such as a compression or a tension spring, formed at least in part from a spring metal, a polymeric material and/or an elastomeric material. In this way, the first retaining member may be arranged to apply the net compressive force on the first spacer via the first jaw and the second jaw.

In one example, the first retaining member does not comprise a threaded fastener, for example a bolt or a screw. In one example, the releasable clamp is not arranged to open and/or close using a threaded fastener and/or comprise a threaded fastener. Threaded fasteners may not be suitable for use with relatively soft articles, such as formed from a metal such as lead or an alloy thereof. For example, while threads may be formed and/or machined in such a metal, stripping of such threads in use is problematic when used with a relatively harder threaded fastener. Hence, the releasable clamp avoids such problematic scenarios.

In one example, the first spacer and the first retaining member are integrally formed, for example as a single part or monolithically. In this way, configuring the releasable clamp in the second configuration may be facilitated since the releasable clamp includes fewer components while more accurately and/or precisely holding the article, for example in desired or target dispositions and/or more repeatedly controlling compressive forces applied to the article.

Regions

Respective jaws of the set of jaws comprise the first region for contacting the article, the optional second region defining the portion of the first part of the coupling member, the third region for contacting the respective spacer of the set of spacers and the fourth region for contacting the respective retaining member of the set of retaining members. It should be understood that the regions (i.e. the first region, the optional second region, the third region and the fourth region) are surface regions.

That is, the first region is for contacting the article and thus may be shaped correspondingly to the contacted corresponding region of the article, for example. That is, the optional second region defines the portion of the first part of the coupling member, as described below in more detail. That is, the third region is for contacting the spacer and thus may be shaped correspondingly to the contacted corresponding region of the spacer, for example, as described above. That is, the fourth region is for contacting the retaining member and thus may be shaped correspondingly to the contacted corresponding region of the retaining member, for example, as described above.

In one example, the first region, the optional second region, the third region and the fourth region are different regions, for example mutually spaced apart.

In one example, the first region of a respective jaw of the set of jaws is proximal a first end thereof, the optional second region is proximal a second opposed end thereof and the third region and the fourth region are therebetween.

In one example, the first region and third region of a respective jaw of the set of jaws are proximal a first side thereof and the fourth region is proximal a second opposed side thereof. In this way, the first retaining member may be arranged to apply the net compressive force on the first spacer via the first jaw and the second jaw in the second configuration. In one example, the optional second region is proximal the first side or the second side.

In one example, the first region, the second region, the third region and/or the fourth region are machined, for example fully machine. Corresponding regions of the first spacer and/or the first retaining member may also be machined. In this way, the article may be held more accurately and/or precisely.

First Configuration and Second Configuration

The clamp is configurable in:

the first configuration, wherein the first jaw and the second jaw are mutually unjoined; and the second configuration, wherein the first spacer is arranged to space apart the first jaw and the second jaw and wherein the first retaining member is arranged to apply the net compressive force on the first spacer via the first jaw and the second jaw, whereby the first jaw and the second jaw are conjoined and thereby hold the article therebetween.

That is, in the first configuration, the first jaw and the second jaw are separate and/or separable, for example moveably separable (i.e. mutually unjoined), such that the article may not be held therebetween. That is, the first configuration is an open configuration.

That is, in the second configuration, the first retaining member conjoins the first jaw and the second jaw by clamping the first jaw, the second jaw and the spacer therebetween, thereby holding the article between the first jaw and the second jaw, for example between the respective first regions thereof. That is, the second configuration is a closed configuration.

It should be understood that the releasable clamp is repeatedly configurable in the first configuration and the second configuration. That is, the releasable clamp is configured to move from the first configuration to the second configuration and vice versa, repeatedly.

In one example, the clamp is configured to move from the first configuration to the second configuration by inserting the first spacer between the first jaw and the second jaw (for example, between the respective third regions thereof), thereby spacing apart the first jaw and the second jaw, and by clamping, using the first retaining member, the first jaw, the second jaw (for example, the respective fourth regions thereof) and the inserted spacer therebetween. Additionally and/or alternatively, in one example, the clamp is configured to move from the first configuration to the second configuration by clamping, using the first retaining member, the first jaw and the second jaw (for example, the respective fourth regions thereof) therebetween and by inserting the first spacer between the clamped first jaw and the second jaw (for example, between the respective third regions thereof), thereby spacing apart the first jaw and the second jaw. In this way, holding the article in the releasable clamp is facilitated, since by clamping, using the first retaining member, the first jaw, the second jaw (for example, the respective fourth regions thereof) and the inserted spacer therebetween, the article is held in the releasable clamp. In this way, no specialist tools are required and/or this moving may be performed by a single human operator, for example.

In one example, the clamp is configured to move from the second configuration to the first configuration by reverse steps i.e. by removing the first spacer and unclamping the first retaining member.

In one example, the clamp is configurable in a third configuration, wherein the first spacer is arranged to space apart the first jaw and the second jaw and wherein the first retaining member is not arranged to apply the net compressive force on the first spacer via the first jaw and the second jaw, whereby the first jaw and the second jaw are not conjoined and thereby do not hold the article therebetween.

In one example, the clamp is configurable in a fourth configuration, wherein the first spacer is not arranged to space apart the first jaw and the second jaw and wherein the first retaining member is arranged to contact the first jaw and the second jaw, whereby the first jaw and the second jaw are not conjoined and thereby do not hold the article therebetween.

Coupling Member

The optional second region defines the portion of the first part of the coupling member. The coupling member is for coupling the releasable clamp to a mount, for example a clamp mount, as described below. It should be understood that the second region is optional and thus the releasable clamp may not include such a second region.

In one example, the first part of the coupling member comprises and/or is a male coupling member, for example a convex member such as a protrusion, a ridge or a lip.

Shape

In one example, the set of jaws define a symmetrical envelope, for example having a circular or a polygonal cross-section (e.g. having J sides or a multiple thereof sides, as defined above), such as a generally cylindrical envelope or a generally polyhedral envelope, respectively. In one example, respective jaws of the set of jaws comprise and/or are at least a part of a section or a segment of such a symmetrical envelope.

In one example, the first region (for contacting the article) comprises and/or is at least a part of a cylindrical bore region (i.e. defined, at least, by a first inner radius and thus an inner surface region).

In one example, the optional second region (defining the portion of the first part of the coupling member) comprises and/or is at least a part of a cylindrical region (i.e. defined, at least, by a first outer radius and thus an outer surface region).

In one example, the third region (for contacting the spacer) comprises and/or is a planar region, for example an inner surface region.

In one example, the fourth region (for contacting the retaining member) comprises and/or is at least a part of a cylindrical region (i.e. defined, at least, by a second outer radius and thus an outer surface region). In one example, the fourth region is for contacting a clamp mount, as described below.

In one example, the first retaining member comprises a set of cylindrical bore regions, including a first bore region and a second bore region, for contacting correspondingly shaped fourth regions of the respective jaws (i.e. the first jaw and the second jaw respectively) (i.e. defined, at least, by a second inner radius and thus an inner surface region). In one example, the second inner radius corresponds with the second outer radius (i.e. the same, providing an interference fit or providing a clearance fit).

In one example, the first spacer extends across at least a radius of the respective bore regions and/or wherein the first bore region and the second bore region are diametrically opposed.

In one example, the first retaining member is generally U or C shaped, having a mouth smaller than the second inner radius. In this way, the first retaining member may interlock with the first jaw and the second jaw.

In one example, a height of the first spacer is the same as a height of the first retaining member. In one example, a height of the first spacer is greater than a height of the first retaining member.

Resilient Biasing Member

In one example, the releasable clamp comprises a resilient biasing member between the first jaw and the second jaw arranged to bias the article in contact with respective first regions of the first jaw and the second jaw. In this way, the article may be held more accurately and/or precisely, for example in a desired or a target disposition.

Clamp Assembly

The second aspect provides a clamp assembly comprising:
  a releasable clamp according to the first aspect; and
  a clamp mount, comprising a corresponding second part of the coupling member;
  wherein the clamp assembly is arrangeable in:
  a first arrangement, wherein the clamp and the clamp mount are mutually uncoupled; and
  a second arrangement, wherein respective portions of the first part of the coupling member of the set of jaws are coupled with the corresponding second part of the coupling member, when the clamp is configured in the second configuration.

It should be understood that the releasable clamp according to the first aspect comprises the second region defining the portion of the first part of the coupling member.

In this way, the article may be held in the releasable clamp and the clamp may be coupled with the clamp mount, for example in an apparatus.

It should be understood that the clamp assembly is repeatedly arrangeable in the first arrangement and the second arrangement. That is, the clamp assembly is arranged to move from the first arrangement to the second arrangement and vice versa, repeatedly.

In one example, the corresponding second part of the coupling member comprises and/or is a female coupling member, for example a concave member such as a recess, a slot or an aperture.

In one example, the female coupling member is arranged, for example shaped and/or sized, to admit (for example, by insertion therein) the portion of the first part of the coupling member of respective jaws when the releasable clamp is configured in the first configuration and to couple with the portion of the first part of the coupling member of respective jaws when the releasable clamp is configured in the second configuration. In one example, the female coupling member is arranged, for example shaped and/or sized, to contact the fourth region of the first jaw and/or the second jaw. For example, the female coupling member may comprise and/or is an aperture defining at least a part of a cylindrical region corresponding with the fourth region.

In one example, the clamp assembly is arranged to move from the first arrangement to the second arrangement by positioning or colocating, for example successively, respective portions of the first part of the coupling member of the set of jaws (i.e. respective second regions) and the corresponding second part of the coupling member, inserting the first spacer between the first jaw and the second jaw (for example, between the respective third regions thereof), thereby spacing apart the first jaw and the second jaw, and by clamping, using the first retaining member, the first jaw, the second jaw (for example, the respective fourth regions thereof) and the inserted spacer therebetween, thereby coupling the respective portions of the first part of the coupling member of the set of jaws with the corresponding second part of the coupling member and conjoining the first jaw and the second jaw are conjoined, thereby holding the article therebetween the first jaw and the second jaw. In other words, moving the releasable clamp into the second configuration additionally and/or simultaneously moves the clamp assembly into the second arrangement. In this way, holding the article in the releasable clamp mounted in the clamp mount is facilitated, since by clamping, using the first retaining member, the first jaw, the second jaw (for example, the respective fourth regions thereof) and the inserted spacer therebetween, the releasable clamp is coupled to the clamp mount and the article is held in the releasable clamp. In this way, no specialist tools are required and/or this moving may be performed by a single human operator, for example.

Additionally and/or alternatively, in one example, the clamp assembly is arranged to move from the first arrangement to the second arrangement by positioning or colocating, for example successively, respective portions of the first part of the coupling member of the set of jaws (i.e. respective second regions) and the corresponding second part of the coupling member, clamping the first jaw and the second jaw (for example, the respective fourth regions thereof) therebetween and by inserting the first spacer between the clamped first jaw and the second jaw (for example, between the respective third regions thereof), thereby spacing apart the first jaw and the second jaw.

In one example, the clamp assembly is arranged to move from the second arrangement to the first arrangement by reverse steps.

In one example, the clamp assembly comprises a set of releasable clamps and/or the clamp mount comprises a set of corresponding second parts of respective coupling members. In this way, multiple releasable clamps may be coupled to the clamp mount and/or in multiple positions, for example.

In one example, the clamp assembly comprises a set of clamp mounts, optionally wherein respective clamp mounts of the set of clamp mounts are arrangeable in a stack, for example coaxially.

Article

The third aspect provides an article for holding in a releasable clamp according to the first aspect, wherein the article comprises a source of ionizing radiation, for example 241Am, 133Ba and/or 152Eu. Such a source of ionizing radiation is suitable for a radiation detector, such as a Compton radiation backscatter detector.

Assembly

The fourth aspect provides an assembly comprising a clamp assembly according to the second aspect and a set of articles, including a first article, according to the third aspect.

Method

A fifth aspect provides a method of holding an article according to the third aspect in a releasable clamp according to the first aspect, optionally in a clamp assembly according to the second aspect.

In one example, the method comprises moving the releasable clamp from the first configuration to the second configuration by:

inserting the first spacer between the first jaw and the second jaw (for example, between the respective third regions thereof), thereby spacing apart the first jaw and the second jaw; and clamping the first jaw, the second jaw (for example, the respective fourth regions thereof) and the inserted spacer therebetween.

Additionally and/or alternatively, in one example, the method comprises:

moving the releasable clamp from the first configuration to the second configuration by clamping the first jaw and the second jaw (for example, the respective fourth regions thereof) therebetween; and inserting the first spacer between the clamped first jaw and the second jaw (for example, between the respective third regions thereof), thereby spacing apart the first jaw and the second jaw.

In one example, the method comprises moving the clamp from the second configuration to the first configuration by reverse steps i.e. by removing the first spacer and unclamping the first retaining member.

In one example, the method comprises moving the clamp assembly from the first arrangement to the second arrangement by:

positioning or colocating, for example successively, respective portions of the first part of the coupling member of the set of jaws (i.e. respective second regions) and the corresponding second part of the coupling member;

inserting the first spacer between the first jaw and the second jaw (for example, between the respective third regions thereof), thereby spacing apart the first jaw and the second jaw;

and clamping the first jaw, the second jaw (for example, the respective fourth regions thereof) and the inserted spacer therebetween, thereby coupling the respective portions of the first part of the coupling member of the set of jaws with the corresponding second part of the coupling member and conjoining the first jaw and the second jaw, thereby holding the article therebetween the first jaw and the second jaw.

Additionally and/or alternatively, in one example, the method comprises moving the clamp assembly from the first arrangement to the second arrangement by:

positioning or colocating, for example successively, respective portions of the first part of the coupling member of the set of jaws (i.e. respective second regions) and the corresponding second part of the coupling member;

clamping the first jaw and the second jaw (for example, the respective fourth regions thereof) therebetween; and inserting the first spacer between the clamped first jaw and the second jaw (for example, between the respective third regions thereof), thereby spacing apart the first jaw and the second jaw.

In one example, the method comprises moving the clamp assembly from the second arrangement to the first arrangement by reverse steps.

Radiation Backscatter Detector

The sixth aspect provides a radiation backscatter detector comprising a releasable clamp according to the first aspect, a clamp assembly according to the second aspect, an article according to the third aspect and/or an assembly according to the fourth aspect.

In one example, radiation backscatter detector comprises:

a source array comprising source components for irradiating a shared sample location, at least two source components of the array generating radiation in different respective source energy bands;

a detector array comprising detector elements for detecting backscattered radiation detection events from different respective spatial portions of the shared sample location, the detector elements each generating a pulse output in response to each radiation detection event it detects; and an energy meter for measuring the energies of the pulse outputs by different respective detector elements.

It should be understood that the source array comprises and/or is the assembly according to the third aspect and the source components comprise and/or are articles according to the third aspect.

The radiation backscatter detector, for example a Compton radiation backscatter detector, finds particular application in detecting concealed materials.

The different respective spatial portions of the shared sample location may, in practice, overlap as any one backscatter radiation event may trigger a response in more than one detector element. However, it is important that the outputs from different respective detector elements can be distinguished.

The radiation backscatter detector may further comprise an event collator for sorting pulse outputs according to their measured energy, the outputs being generated by at least two different detector elements. Preferably, the pulse outputs are also sorted according to the respective detector elements generating them. This supports at least a basic mapping process for material distribution over the shared sample location.

The radiation backscatter detector may further comprise a counter for counting sorted pulse outputs having a measured energy in each of at least two different detector energy bands. These pulse output counts can then be processed, using a processor, to give a pulse count ratio between the detector energy bands for each detector element. It has been found that material types or groups can be distinguished by this pulse count ratio. Thus embodiments of the invention can potentially detect and map the distribution of a material group across the shared sample location by mapping the count ratio from different detector elements.

It might be noted that it may not be possible to identify individual materials by these energy bands in that for example a lithium ion battery, borosilicate glass and aluminium all might produce the same or similar measured ratio. However, the energy bands for one material type or group has been found to be characteristically different from that of another type or group. Material groups potentially of interest in this respect are explosives and narcotics.

The detector array may be considered as a tiled distribution of detector elements. Each tile might represent a detector element, the tile producing a pulse output in response to each radiation detection event it detects. The tiles might each comprise a single device or a group of devices generating between them a common output. The shape of the tiles is preferably a shape that means they can be packed together closely and contiguously, producing a "tessellated" array of tiles. This means that the shared sample location can be examined for radiation backscatter without significant gaps. For example, the tiles might be of a regular shape such as square, rectangular or hexagonal.

In order to measure a characteristic response in different energy bands, even at extremely low backscatter levels, it is possible to use a scintillator together with a photo-multiplying detector. In order to achieve the scale necessary to map material distribution across the kind of devices that might have been used for concealment in the modern day, embodiments of the invention may comprise a silicon photomultiplier. Known silicon photomultipliers are based on an array of avalanche photodiodes (APDs), each of which has its own output, for example by means of its own quenching resistor. An advantage of a detector array comprising APDs is the small scale of individual APDs together with the ability to respond to extremely low levels of photon flux, even to individual photons. A known form is the single photon avalanche photodiode (SPAD), for example as used in medical imaging.

It is known to provide a tiled array of APDs, in particular SPADs. Each tile in a particular known arrangement comprises a set of microcells. Each microcell is a SPAD with its own quenching resistor. A microcell is fired in response to an absorbed photon from the scintillator. A current flows from that microcell onto an output line from its tile. Although each microcell fires independently, the sum of their currents flowing on the output line indicates the magnitude of the instantaneous photon flux across the tile.

The detector array can act as a channelised photon counter, each channel being dedicated to a detector element. The photon flux occurring during a pulse output indicates the energy of that pulse output and, in a known detector array, might be expressed as an electrical charge or output current.

Using SPADs in this context, it might be noted that each SPAD has to be reset after firing on detection of a photon. For the accurate detection of photon numbers, the photon flux needs to be sufficiently low that the number of coincident photon absorption events is small for each SPAD. If more than one photon is absorbed by a microcell during the period from firing to reset, then only one photon is recorded as having arrived.

In this context, the tile (detector element) produces a pulse output in terms of the rise and fall of the photon flux over time, and hence the integrated current (or an equivalent value) over the course of the pulse gives the energy of the pulse output and therefore indicates in which energy band, if any, it should be counted.

The source components may comprise at least two different radioisotopes, for example selected from isotopes of americium, barium and/or europium. These different source isotopes will generate radiation at different respective spectral emission lines, thus generating radiation in the different respective source energy bands. Further, they are commercially available "off the shelf" and have an appropriate half-life. However, other isotypes of other elements may be found suitable. Preferably, the source components are distributed in relation to the detector elements, for instance spaced along a one dimensional array of detector elements or positioned as a network across a two-dimensional array of detector elements. The source components may be positioned to give a predictable irradiation pattern over the shared sample location, and preferably an even distribution in each source energy band. This may be expressed as an even intensity for the backscatter intensity reaching the detector elements, in terms of the Compton differential scattering cross section integrated over the solid angle encompassed by each detector tile.

Since the source components will not themselves detect backscattered radiation, they effectively create at least a partial break, or shadow, in relation to the detector array. The sources will normally be mounted on discs such as lead or tungsten discs to prevent radiation from them directly entering the detector array. It may therefore, particularly in a two dimensional detector array, be preferable to mount the source components along the boundaries of the detector elements.

Definitions

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

DETAILED DESCRIPTION OF THE DRAWINGS

Releasable Clamp

FIGS. 1A to 1H and FIGS. 2A to 2D show a releasable clamp 10 configured in a first configuration. FIGS. 6A to 6C, FIGS. 7A to 7C and FIGS. 8A to 8C show a clamp assembly 1 comprising the releasable clamp 10 configured in a second configuration. FIG. 9 is a photograph of a clamp assembly according to an exemplary embodiment, manufactured according to FIGS. 1 to 8.

FIGS. 1A to 1H schematically depict a first jaw 100A for the releasable clamp 10 according to an exemplary embodiment.

Figure 1A:
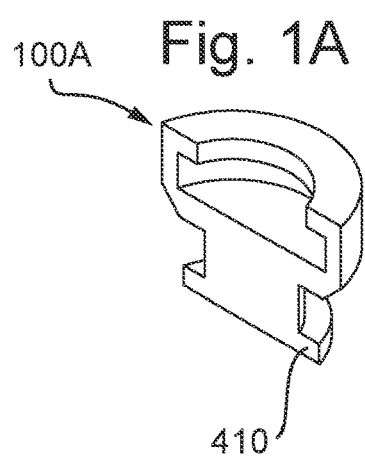
FIGS. 1A to 1H schematically depict a first jaw for a releasable clamp according to an exemplary embodiment.
Figure 1B:
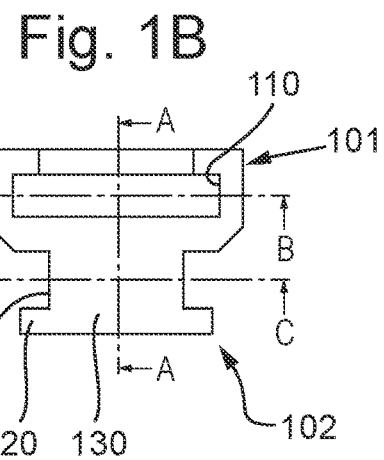
Figure 1C:
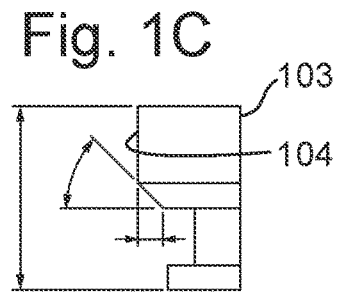
Figure 1D:
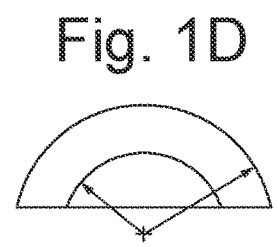
Figure 1E:
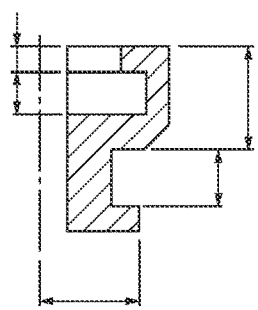
Figure 1F:
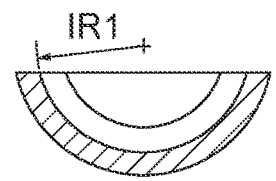
Figure 1G:
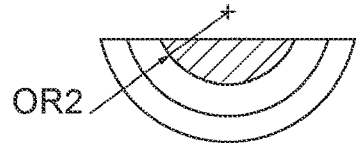
Figure 1H:
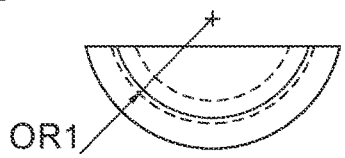

Particularly, FIG. 1A shows a perspective view of the first jaw 100A, FIG. 1B shows a front elevation view of the first jaw 100A, FIG. 1C shows a side elevation view of the first jaw 100A, FIG. 1D shows an upper plan view of the first jaw 100A, FIG. 1E shows a section A-A of the first jaw 100A, FIG. 1F shows a section B-B of the first jaw 100A, FIG. 1G shows a section C-C of the first jaw 100A and FIG. 1H shows a lower plan view of the first jaw 100A.

FIGS. 2A to 2D schematically depict a first spacer 200A and a first retaining member 300A for a releasable clamp 10 according to an exemplary embodiment.

Figure 2A:
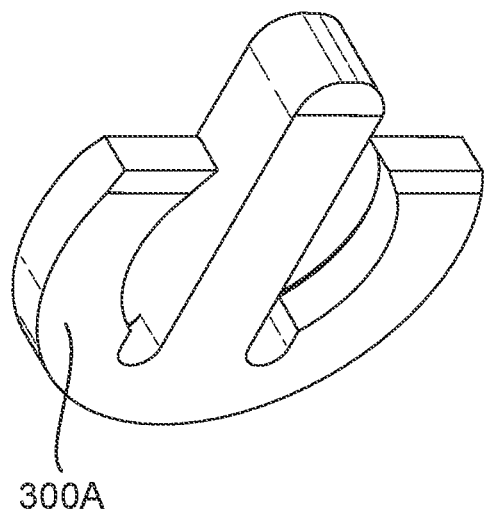
FIGS. 2A to 2D schematically depict a first spacer and a first retaining member for a releasable clamp according to an exemplary embodiment.
Figure 2B:
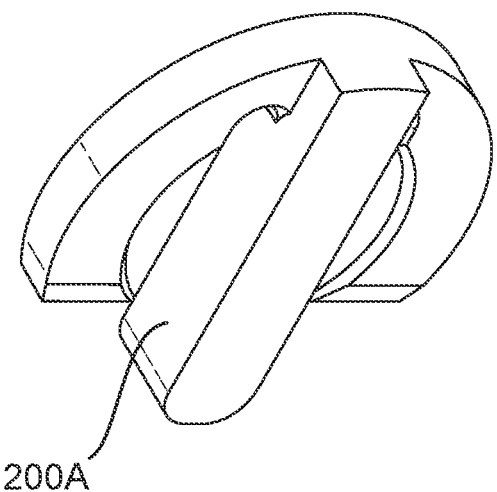
Figure 2C:
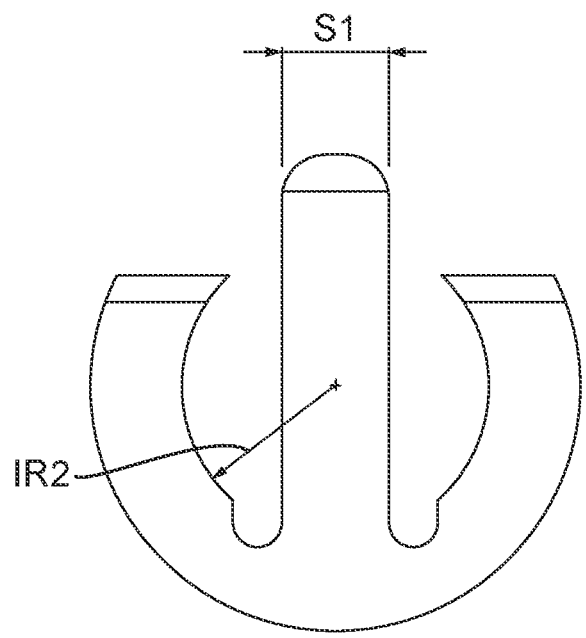
Figure 2D:
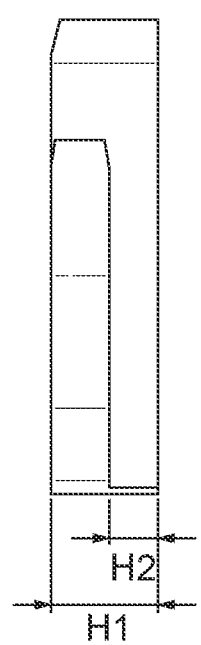

Particularly, FIG. 2A shows an upper perspective view of first spacer 200A and the first retaining member 300A, FIG. 2B shows a lower perspective view of first spacer 200A and the first retaining member 300A, FIG. 2C shows an upper plan view of first spacer 200A and the first retaining member 300A and FIG. 2D shows a front elevation view of first spacer 200A and the first retaining member 300A.

The releasable clamp 10 is for holding an article 1000 or parts thereof, for example a device or a tool, the clamp 10 comprising:

a set of jaws, including a first jaw 100A and a second jaw 100B, arrangeable to hold the article 1000 therebetween;

a set of spacers, including a first spacer 200A, arrangeable to space apart respective jaws of the set of jaws; and a set of retaining members, including a first retaining member 300A, arrangeable to space together respective jaws of the set of jaws;

wherein respective jaws of the set of jaws comprise a first region 110 for contacting the article 1000, an optional second region 120 defining a portion of a first part 410 of a coupling member, a third region 130 for contacting a respective spacer of the set of spacers and a fourth region 140 for contacting a respective retaining member of the set of retaining members; wherein the clamp 10 is configurable in:

a first configuration, wherein the first jaw 100A and the second jaw 100B are mutually unjoined; and a second configuration, wherein the first spacer 200A is arranged to space apart the first jaw 100A and the second jaw 100B and wherein the first retaining member 300A is arranged to apply a net compressive force on the first spacer 200A via the first jaw 100A and the second jaw 100B, whereby the first jaw 100A and the second jaw 100B are conjoined and thereby hold the article 1000 therebetween.

In this example, the releasable clamp 10 is for holding the article 1000 or parts thereof accurately and/or precisely, for example in a desired or target disposition. For example, the releasable clamp 10 may hold parts of the article 1000 in a predetermined relative arrangement and/or predetermined relative positions.

Jaws

The releasable clamp 10 comprises the set of jaws, including the first jaw 100A and the second jaw 100B, arrangeable to hold the article 1000 therebetween. In this example, the set of jaws includes only 2 jaws (i.e. the first jaw 100A and the second jaw 100B). In this example, the first jaw 100A and the second jaw 100B are similar, for example the same (i.e. identical). In this example, the first jaw 100A and the second jaw 100B are mutually paired.

Generally, the first jaw 100A and the second jaw 100B may be described as half goblets, in which the goblet (i.e. a jaw precursor) is divided axially into the first jaw 100A and the second jaw 100B, for example by a blade having a finite width. Hence, the first region 110 for contacting the article 1000 is provided by the goblet bowl, the optional second region 120 defining a portion of a first part 410 of a coupling member is provided by the goblet base, the third region 130 for contacting the respective spacer of the set of spacers is provided by the divided goblet stem (i.e. a planar surface thereof) and the fourth region 140 for contacting the respective retaining member of the set of retaining members is provided by the goblet stem (i.e. a convex, part-cylindrical surface thereof).

In this example, the first jaw 100A and the second jaw 100B are machined from hard brass BS2874 CZ121-3Pb-M.

Spacers

The releasable clamp 10 comprises the set of spacers, including the first spacer 200A, arrangeable to space apart respective jaws of the set of jaws. In this example, the first spacer 200A defines a first spacing S1 between the first jaw 100A and the second jaw 100B. In this example, the set of spacers includes 1 spacer (i.e. the first spacer 200A).

In this example, the first spacer 200A comprises and/or is a parallel-sided spacer, for example a parallel key and wherein respective third regions 130 are correspondingly shaped.

Retaining Members

The releasable clamp 10 comprises the set of retaining members, including the first retaining member 300A, arrangeable to space together respective jaws of the set of jaws. In this example, the set of retaining members includes only 1 retaining member (i.e. the first retaining member 300A).

In this example, the first retaining member 300A is arranged to interlock around the first jaw 100A and the second jaw 100B.

In this example, the first retaining member 300A comprises and/or is a resiliently-biased retaining member. In this example, the first retaining member 300A comprises a mechanical spring, such as a compression or a tension spring, formed by additive manufacturing from a photopolymer resin (FLTOTL03) i.e. a polymeric material.

In this example, the first retaining member 300A does not comprise a threaded fastener, for example a bolt or a screw. In this example, the releasable clamp 10 is not arranged to open and/or close using a threaded fastener and/or comprise a threaded fastener.

In this example, the first spacer 200A and the first retaining member 300A are integrally formed, for example as a single part or monolithically. In this way, configuring the releasable clamp 10 in the second configuration may be facilitated since the releasable clamp 10 includes fewer components while more accurately and/or precisely holding the article 1000, for example in desired or target dispositions and/or more repeatedly controlling compressive forces applied to the article 1000.

Generally, the first spacer 200A and the first retaining member 300A together form an E or a Euro symbol (€) plan view in which the first retaining member 300A has a C shape and the parallel first spacer 200A bisects the C shape, extending beyond a mouth of the C shape.

Regions

In this example, the first region 110, the second region 120, the third region 130 and the fourth region 140 are different regions, for example mutually spaced apart.

In this example, the first region 110 of a respective jaw of the set of jaws is proximal a first end 101 thereof, the second region 120 is proximal a second opposed end 102 thereof and the third region 130 and the fourth region 140 are therebetween.

In this example, the first region 110 and third region 130 of a respective jaw of the set of jaws are proximal a first side 103 thereof and the fourth region 140 is proximal a second opposed side 104 thereof. In this example, the second region 120 is proximal the second side 104.

First Configuration and Second Configuration

The clamp 10 is configurable in:

the first configuration, wherein the first jaw 100A and the second jaw 100B are mutually unjoined; and the second configuration, wherein the first spacer 200A is arranged to space apart the first jaw 100A and the second jaw 100B and wherein the first retaining member 300A is arranged to apply the net compressive force on the first spacer 200A via the first jaw 100A and the second jaw 100B, whereby the first jaw 100A and the second jaw 100B are conjoined and thereby hold the article 1000 therebetween.

In this example, the clamp 10 is configured to move from the first configuration to the second configuration by inserting the first spacer 200A between the first jaw 100A and the second jaw 100B (for example, between the respective third regions 130 thereof), thereby spacing apart the first jaw 100A and the second jaw 100B, and by clamping, using the first retaining member 300A, the first jaw 100A, the second jaw 100B (for example, the respective fourth regions 140 thereof) and the inserted spacer therebetween. Additionally and/or alternatively, in this example, the clamp 10 is configured to move from the first configuration to the second configuration by clamping, using the first retaining member 300A, the first jaw 100A and the second jaw 100B (for example, the respective fourth regions 140 thereof) therebetween and by inserting the first spacer 200A between the clamped first jaw 100A and the second jaw 100B (for example, between the respective third regions 130 thereof), thereby spacing apart the first jaw 100A and the second jaw 100B. In this way, holding the article 1000 in the releasable clamp 10 is facilitated, since by clamping, using the first retaining member 300A, the first jaw 100A, the second jaw 100B (for example, the respective fourth region s 140 thereof) and the inserted spacer therebetween, the article 1000 is held in the releasable clamp 10. In this way, no specialist tools are required and/or this moving may be performed by a single human operator, for example.

In this example, the clamp 10 is configured to move from the second configuration to the first configuration by reverse steps i.e. by removing the first spacer 200A and unclamping the first retaining member 300A.

In this example, the clamp 10 is configurable in a third configuration, wherein the first spacer 200A is arranged to space apart the first jaw 100A and the second jaw 100B and wherein the first retaining member 300A is not arranged to apply the net compressive force on the first spacer 200A via the first jaw 100A and the second jaw 100B, whereby the first jaw 100A and the second jaw 100B are not conjoined and thereby do not hold the article 1000 therebetween.

In this example, the clamp 10 is configurable in a fourth configuration, wherein the first spacer 200A is not arranged to space apart the first jaw 100A and the second jaw 100B and wherein the first retaining member 300A is arranged to contact the first jaw 100A and the second jaw 100B, whereby the first jaw 100A and the second jaw 100B are not conjoined and thereby do not hold the article 1000 therebetween.

Coupling Member

The second region 120 defines the portion of the first part 410 of the coupling member. The coupling member is for coupling the releasable clamp 10 to a mount, for example a clamp mount 20, as described below.

In this example, the first part 410 of the coupling member comprises and/or is a male coupling member 410, for example a lip.

Shape

In this example, the set of jaws define a symmetrical envelope, for example having a circular cross-section, such as a generally cylindrical envelope. In this example, respective jaws of the set of jaws comprise and/or are at least a part of a section or a segment of such a symmetrical envelope.

In this example, the first region 110 (for contacting the article 1000) comprises and/or is at least a part of a cylindrical bore region (i.e. defined, at least, by a first inner radius IR1 and thus an inner surface region).

In this example, the second region 120 (defining the portion of the first part 410 of the coupling member) comprises and/or is at least a part of a cylindrical region (i.e. defined, at least, by a first outer radius OR1 and thus an outer surface region).

In this example, the third region 130 (for contacting the spacer) is a planar region, for example an inner surface region.

In this example, the fourth region 140 (for contacting the retaining member) comprises and/or is at least a part of a cylindrical region (i.e. defined, at least, by a second outer radius OR2 and thus an outer surface region).

In this example, the first retaining member 300A comprises a set of cylindrical bore regions, including a first bore region and a second bore region, for contacting correspondingly shaped fourth regions 140 of the respective jaws (i.e. the first jaw 100A and the second jaw 100B respectively) (i.e. defined, at least, by a second inner radius IR2 and thus an inner surface region). In this example, the second inner radius IR2 corresponds with the second outer radius OR2 (i.e. providing a clearance fit).

In this example, the first spacer 200A extends across at least a radius of the respective bore regions and/or the first bore region and the second bore region are diametrically opposed.

In this example, the first retaining member 300A is generally U or C shaped, having a mouth smaller than the second inner radius.

In this example, a height H1 of the first spacer 200A is greater than a height H2 of the first retaining member 300A.

Clamp Assembly

FIGS. 3A to 3D schematically depict a clamp mount 20A for a clamp assembly 1 according to an exemplary embodiment.

Figure 3A:
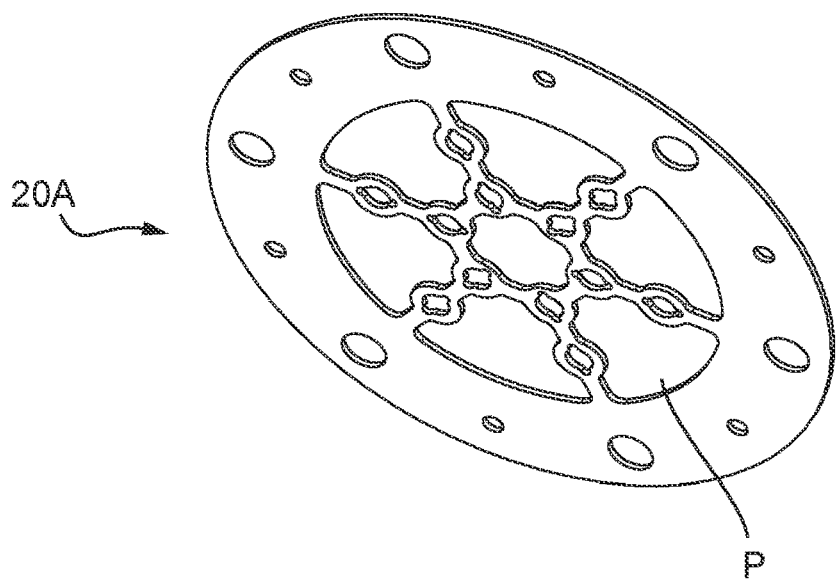
FIGS. 3A to 3D schematically depict a clamp mount for a clamp assembly according to an exemplary embodiment.
Figure 3B:
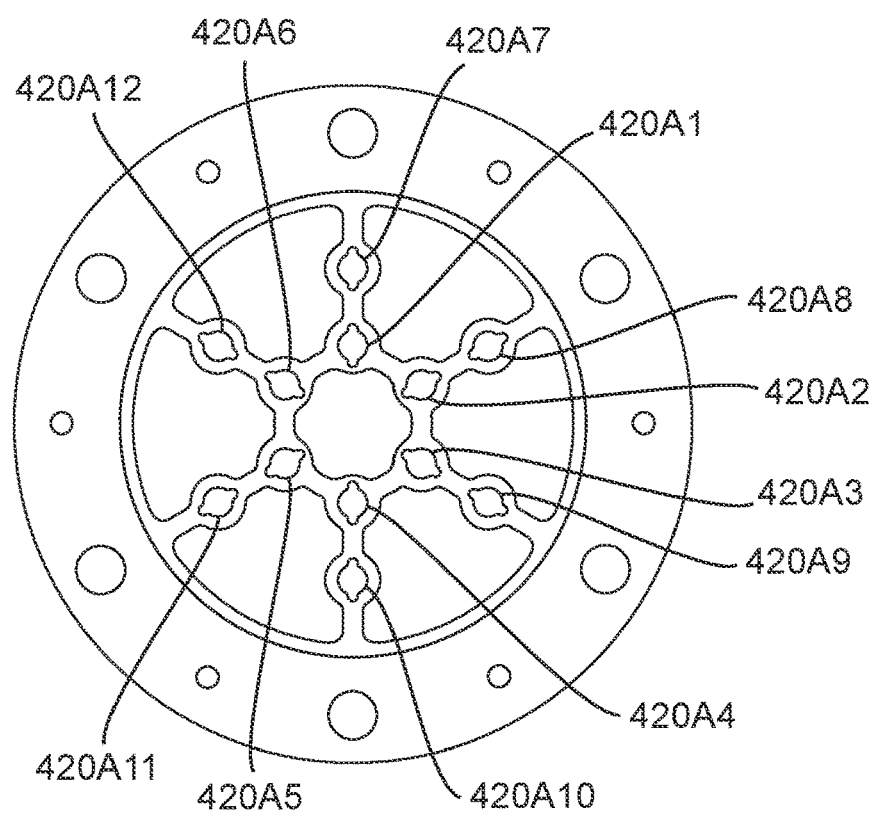
Figure 3C:
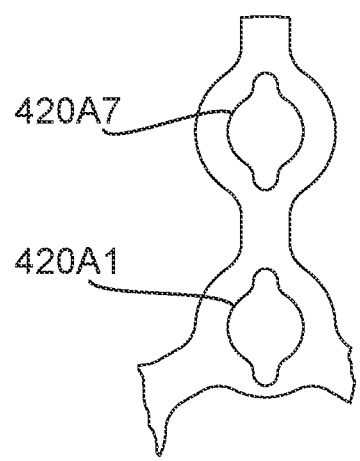
Figure 3D:
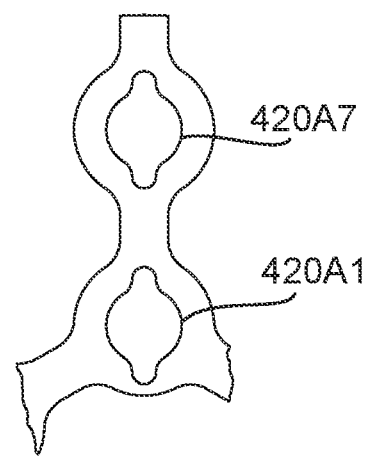

Particularly, FIG. 3A shows a perspective view of the clamp mount 20A, FIG. 3B shows a plan view of the clamp mount 20A, FIG. 3C shows a plan view of a cutout C of the clamp mount 20A in more detail and FIG. 3D shows a plan view of a cutout D of the clamp mount 20A in more detail. The clamp mount 20A is machined from a sheet of an Al alloy (BS1470 6082-T6), preferably a Be alloy. Generally, a thickness and/or a material of the sheet should be selected to reduce radiation absorption thereby for a radiation detector.

Figure 4A:
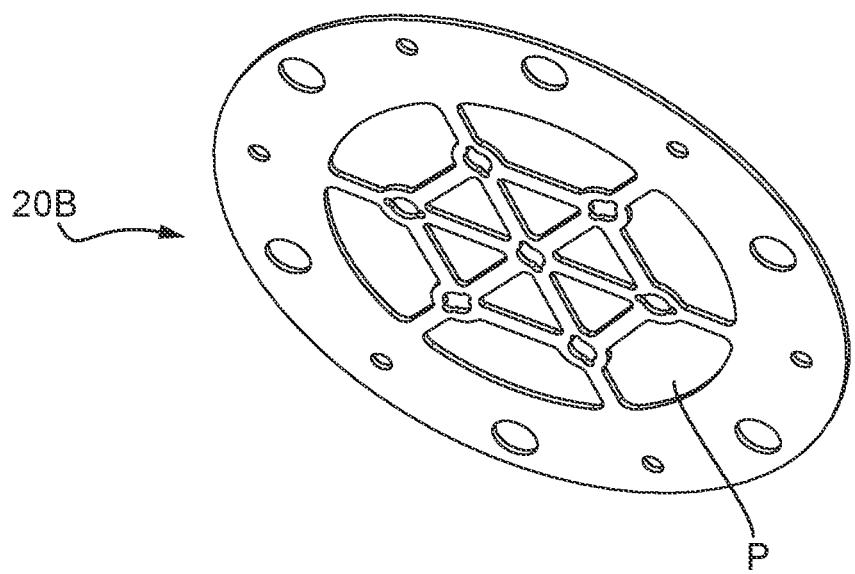
FIGS. 4A to 4C schematically depict a clamp mount for a clamp assembly according to an exemplary embodiment.
Figure 4B:
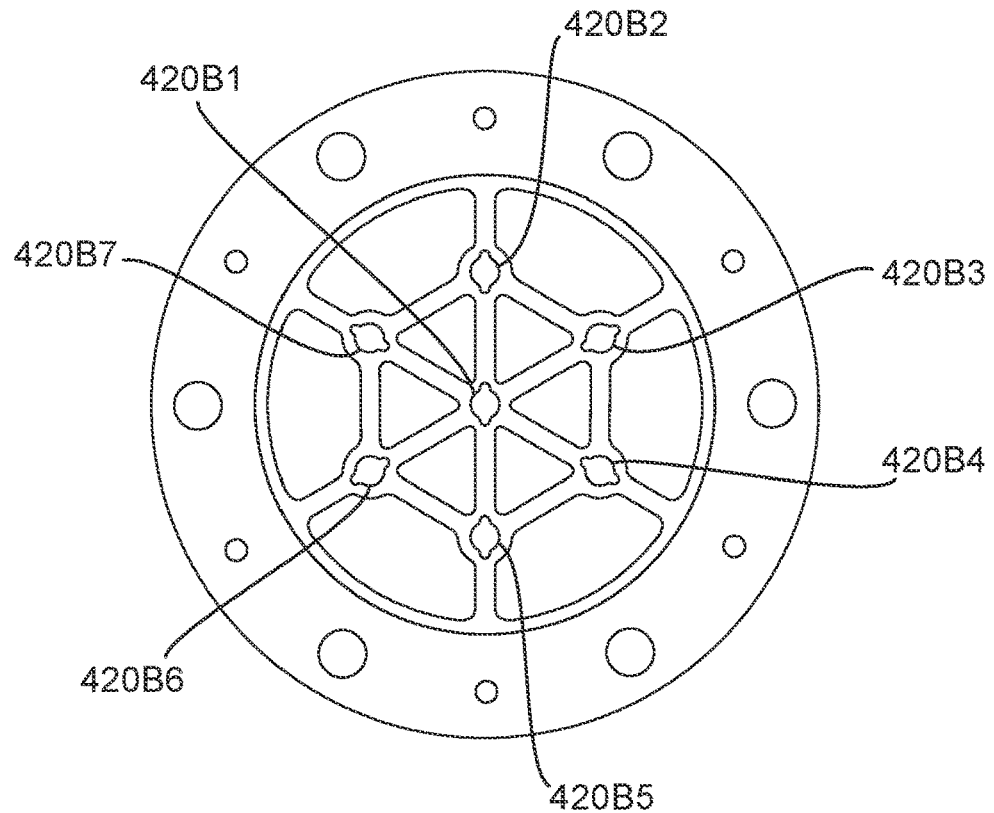
Figure 4C:
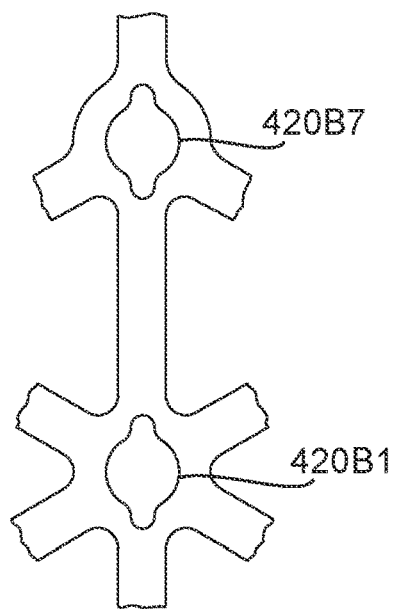

FIGS. 4A to 4C schematically depict a clamp mount 20B for a clamp assembly 1 according to an exemplary embodiment.

Particularly, FIG. 4A shows a perspective view of the clamp mount 20B, FIG. 4B shows a plan view of the clamp mount 20B and FIG. 4C shows a plan view of a cutout C and a cutout D of the clamp mount 20B in more detail. The clamp mount 20 is machined from a sheet of an Al alloy.

The clamp assembly 1 comprises:
the releasable clamp 10; and
the clamp mount 20A, 20B, comprising a corresponding second part 420 of the coupling member;
wherein the clamp assembly 1 is arrangeable in:
a first arrangement, wherein the clamp 10 and the clamp mount 20A, 20B are mutually uncoupled; and
a second arrangement, wherein respective portions of the first part 410 of the coupling member of the set of jaws are coupled with the corresponding second part 420 of the coupling member, when the clamp 10 is configured in the second configuration.

In this example, the corresponding second part 420 of the coupling member comprises and/or is a female coupling member 420, for example a concave member such as a recess, a slot or an aperture.

In this example, the female coupling member 420 is arranged, for example shaped and/or sized, to admit (for example, by insertion therein) the portion of the first part 410 of the coupling member of respective jaws when the releasable clamp 10 is configured in the first configuration and to couple with the portion of the first part 410 of the coupling member of respective jaws when the releasable clamp 10 is configured in the second configuration.

In this example, the clamp assembly 1 is arranged to move from the first arrangement to the second arrangement by positioning or colocating, for example successively, respective portions of the first part 410 of the coupling member of the set of jaws (i.e. respective second regions) and the corresponding second part 420 of the coupling member, inserting the first spacer between the first jaw and the second jaw (for example, between the respective third regions thereof), thereby spacing apart the first jaw and the second jaw, and by clamping, using the first retaining member, the first jaw, the second jaw (for example, the respective fourth regions thereof) and the inserted spacer therebetween, thereby coupling the respective portions of the first part 410 of the coupling member of the set of jaws with the corresponding second part 420 of the coupling member and conjoining the first jaw and the second jaw are conjoined, thereby holding the article therebetween the first jaw and the second jaw. In other words, moving the releasable clamp 10 into the second configuration additionally and/or simultaneously moves the clamp assembly 1 into the second arrangement. In this way, holding the article in the releasable clamp 10 mounted in the clamp mount 20A, 20B is facilitated, since by clamping, using the first retaining member, the first jaw, the second jaw (for example, the respective fourth regions thereof) and the inserted spacer therebetween, the releasable clamp 10 is coupled to the clamp mount 20A, 20B and the article is held in the releasable clamp 10. In this way, no specialist tools are required and/or this moving may be performed by a single human operator, for example.

Additionally and/or alternatively, in this example, the clamp assembly 1 is arranged to move from the first arrangement to the second arrangement by positioning or colocating, for example successively, respective portions of the first part 410 of the coupling member of the set of jaws (i.e. respective second regions) and the corresponding second part 420 of the coupling member, clamping the first jaw and the second jaw (for example, the respective fourth regions thereof) therebetween and by inserting the first spacer between the clamped first jaw and the second jaw (for example, between the respective third regions thereof), thereby spacing apart the first jaw and the second jaw.

In this example, the clamp assembly 1 is arranged to move from the second arrangement to the first arrangement by reverse steps.

In this example, the clamp assembly 1 comprises a set of releasable clamps 10 and the clamp mount 20A, 20B comprises a set of corresponding second parts 420 of respective coupling members. In this way, multiple releasable clamps 10 may be coupled to the clamp mount 20A, 20B and/or in multiple positions, for example.

The clamp mounts 20A, 20B are generally circular, having perforations P therethrough so that they may be stacked with the releasable clamps in a lower clamp mount 20B protruding through the perforations P of the upper clamp mount 20A. Sheet remaining between the perforations P form a spider web and hence the clamp mounts 20A, 20B may be known as spiders.

Particularly, the clamp mount 20A includes 12 corresponding second parts 420A (i.e. 420A1 to 420A12), arranged in two subsets C, D of 6 (i.e. 420A1 to 420A6 and 420A7 to 420A12 respectively). The two subsets are arranged to each form a hexagonal array, at two different radii. Each second part 420A (i.e. 420A1 to 420A12) is comprises a circular aperture in the sheet, having a radius OR1 and hence corresponding (i.e. a clearance fit) with the fourth region 140 of the first jaw 100A and the second jaw 100B, having a radius OR1, as described above. The apertures are elongated at opposed radial sides, thereby facilitating insertion of the jaws therethrough.

Particularly, the clamp mount 20B includes 7 corresponding second parts 4206 (i.e. 420B1 to 420B7), arranged in two subsets C, D of 1 and 6 respectively (i.e. 420B1 and 420B2 to 420B7). The first subset C is arranged centrally. The second subset D is arranged to form a hexagonal array, at a different radius to second parts 420A (i.e. 420A1 to 420A12) of the clamp mount 20A. Each second part 420B is as described with respect to the second part 420A.

In this example, the clamp assembly 1 comprises a set of clamp mounts 20A, 20B, (i.e. two clamp mounts) wherein respective clamp mount 20A, 20Bs of the set of clamp mounts 20A, 20B are arrangeable in a stack, for example coaxially.

FIGS. 5A to 5D schematically depict an article 1000A for holding in the releasable clamp 10 according to an exemplary embodiment.

Figure 5A:
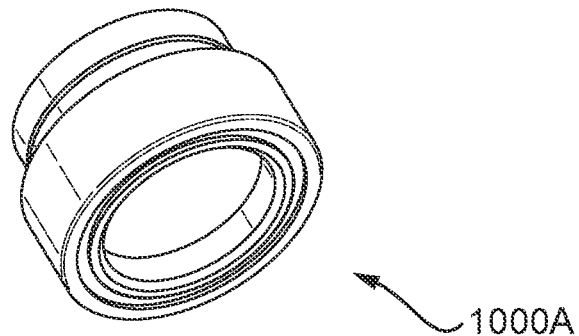
FIGS. 5A to 5D schematically depict an article for holding in a releasable clamp according to an exemplary embodiment.
Figure 5B:
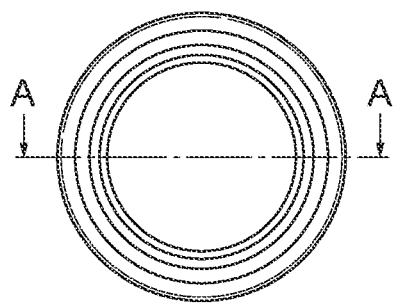
Figure 5C:
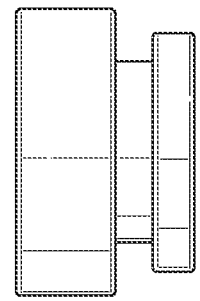
Figure 5D:
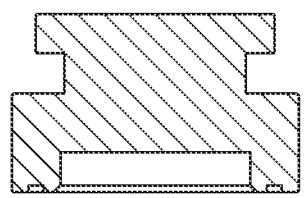

Particularly, FIG. 5A shows a perspective view of the article 1000A, FIG. 5B shows a plan view of the article 1000A, FIG. 5C shows a front elevation view of the article 1000A and FIG. 4D shows a section A-A of the article 1000A.

The article 1000A is for holding in the releasable clamp 10, wherein the article 1000A comprises a source (not shown) of ionizing radiation, for example 241Am, 133Ba and/or 152Eu. Such a source of ionizing radiation is suitable for a radiation detector, such as a Compton radiation backscatter detector.

Generally, the article 1000A may be described as a goblet, having a base contacted by the respective first regions 110 of the first jaw 100A and the second jaw 100B. The source is positioned in a bowl of the article 1000A.

In this example, the goblet is machined from a Pb-based alloy. Generally, a thickness and/or a material of the goblet should be selected to increase radiation absorption for a radiation detector, while reducing a shadow thereof and reducing a distance between the source and the radiation detector. Pb-based alloys, however, are relatively soft and conventional clamps for holding such an article 1000A result in damage thereto, particularly upon repeated opening and closing of the conventional clamps. Hence, the releasable clamp 10 overcomes at least this problem by holding the article 1000A between the first jaw 100A and the second jaw 100B thereof. Alternatively, the goblet may be formed from W or an alloy thereof.

Clamp Assembly—in Use

FIGS. 6A to 6C, FIGS. 7A to 7C and FIGS. 8A to 8C show the clamp assembly 1 comprising the releasable clamp 10 configured in a second configuration, as described above. Particularly, these figures show an assembly A comprising the clamp assembly 1 and a set of articles 1000, including a first article 1000A. FIG. 9 is a photograph of a clamp assembly 1' according to an exemplary embodiment, manufactured according to FIGS. 1 to 8.

FIGS. 6A to 6D schematically depict a clamp assembly 1 according to an exemplary embodiment.

Figure 6A:
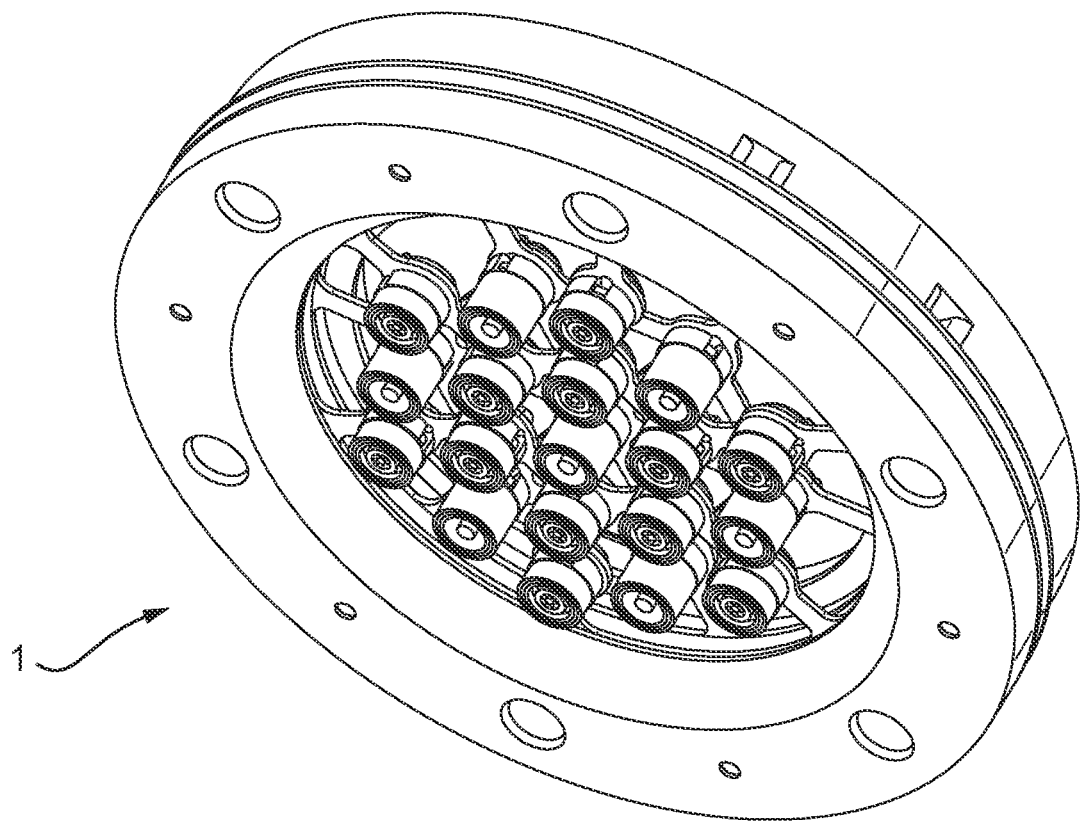
FIGS. 6A to 6C schematically depict a clamp assembly according to an exemplary embodiment.
Figure 6B:
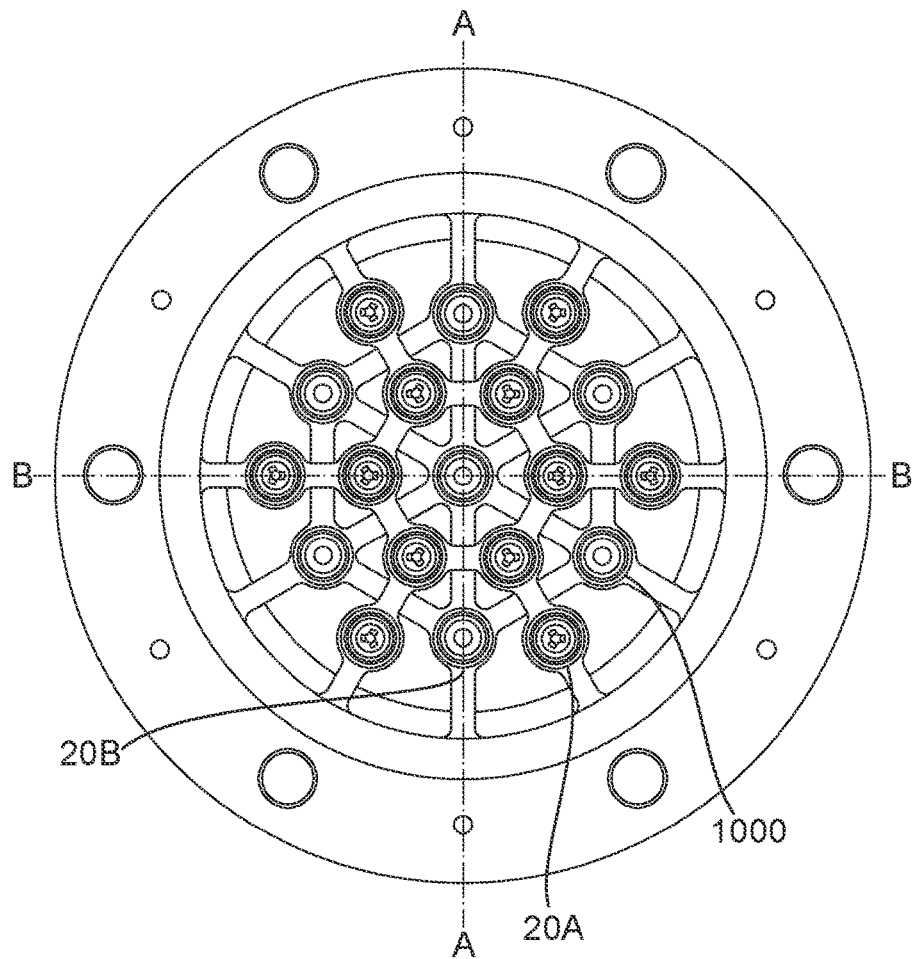
Figure 6C:
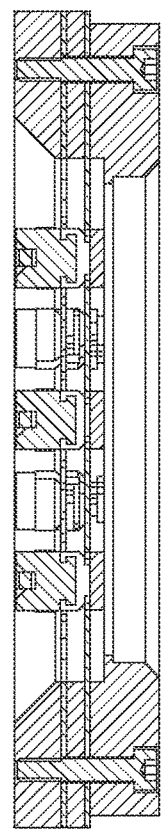
Figure 6D:
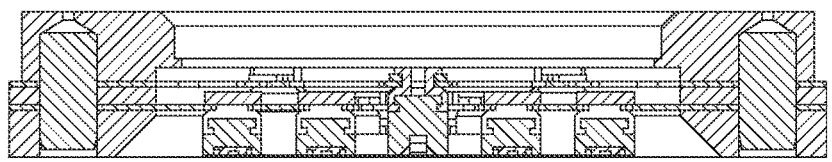

Particularly, FIG. 6A shows an upper perspective view of the clamp assembly 1, FIG. 6B shows an upper plan view of the clamp assembly 1, FIG. 6C shows a section A-A of the clamp assembly 1 and FIG. 6D shows a section B-B of the clamp assembly 1.

Figure 7A:
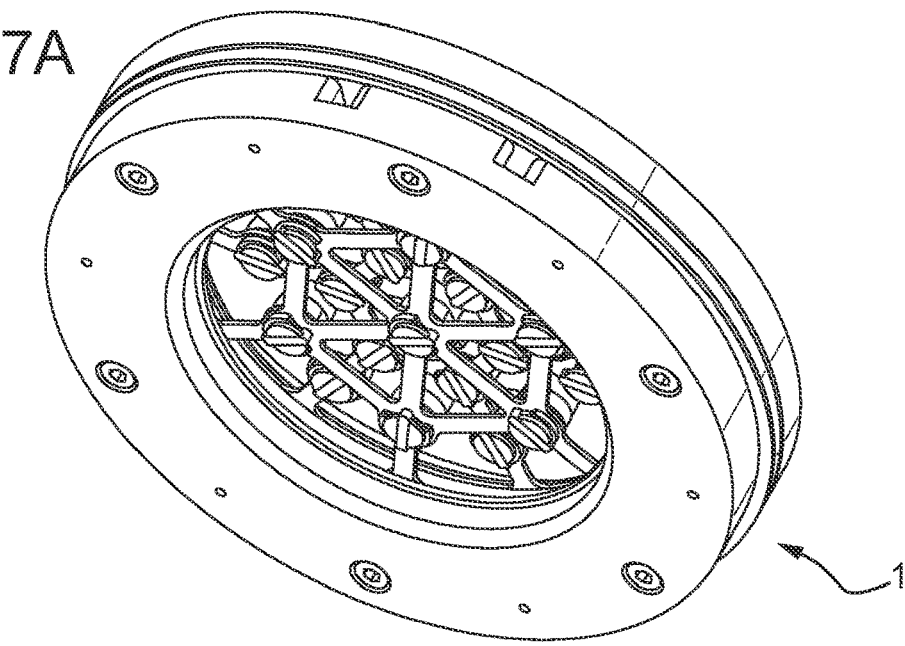
FIGS. 7A to 7C schematically depict the clamp assembly of FIGS. 6A to 6C.
Figure 7B:
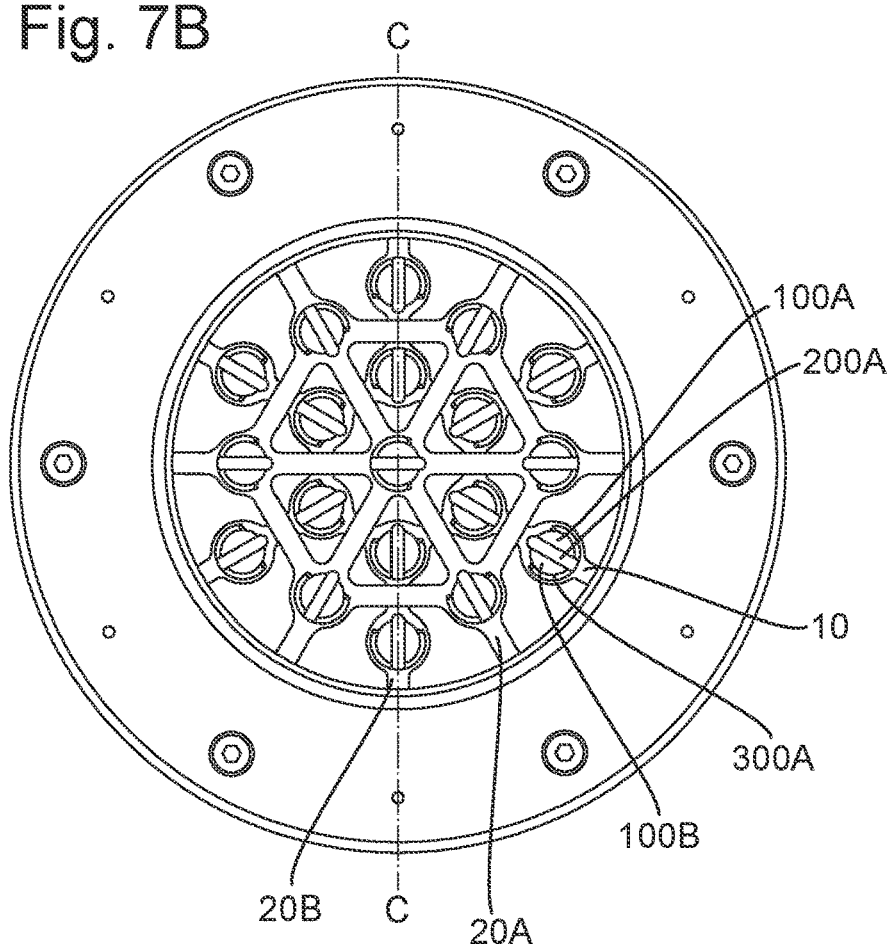
Figure 7C:
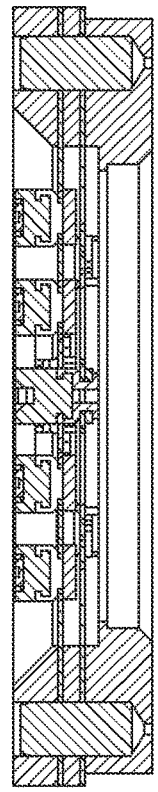

FIGS. 7A to 7C schematically depict the clamp assembly 1 of FIGS. 6A to 6D.

Particularly, FIG. 7A shows a lower perspective view of the clamp assembly 1, FIG. 7B shows a lower plan view of the clamp assembly 1 and FIG. 7C shows a section C-C of the clamp assembly 1.

Figure 8A:
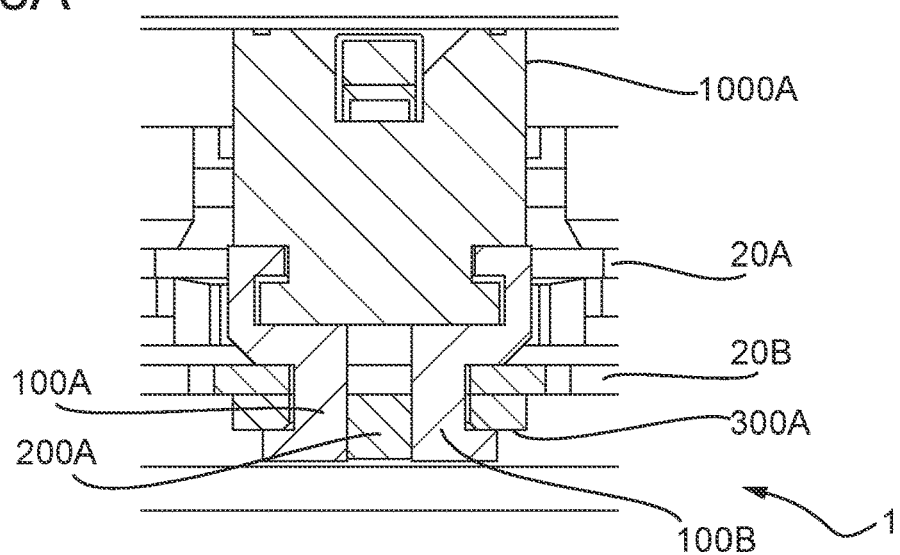
FIGS. 8A to 8C schematically depict the claim assembly of FIGS. 6A to 6C and FIGS. 7A to 7C, in more detail.
Figure 8B:
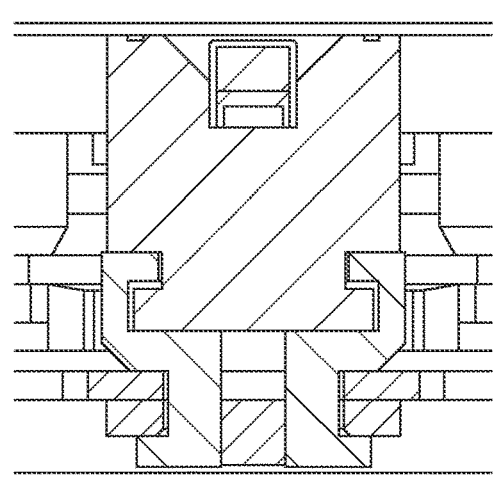
Figure 8C:
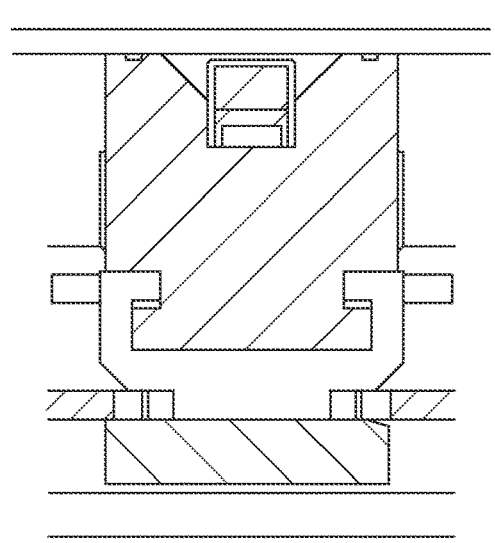
Figure 9:
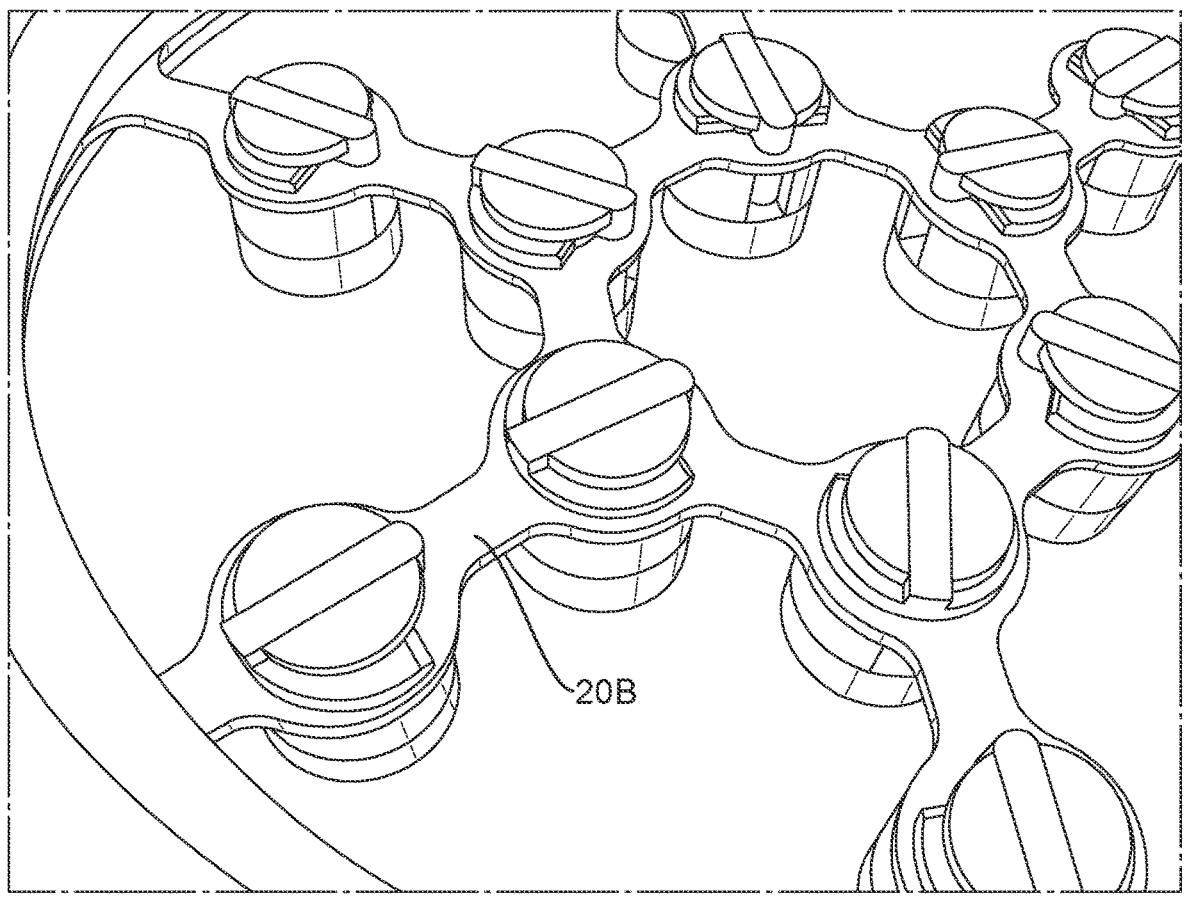
FIG. 9 is a photograph of a clamp assembly according to an exemplary embodiment, manufactured according to FIGS. 1 to 8.
Figure 10A:
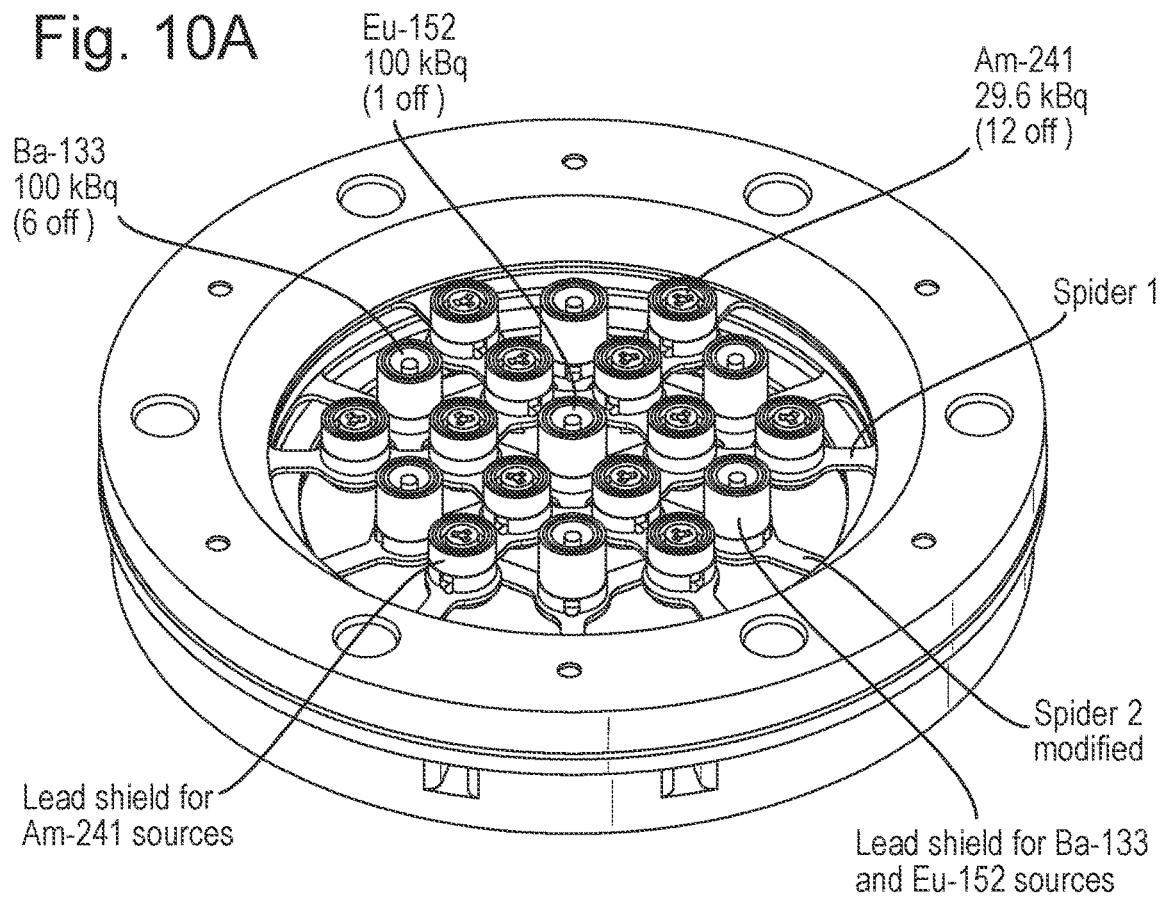
FIGS. 10A to 10F show alternative source dispositions, provided using the clamp assembly of FIG. 9.
Figure 10B:
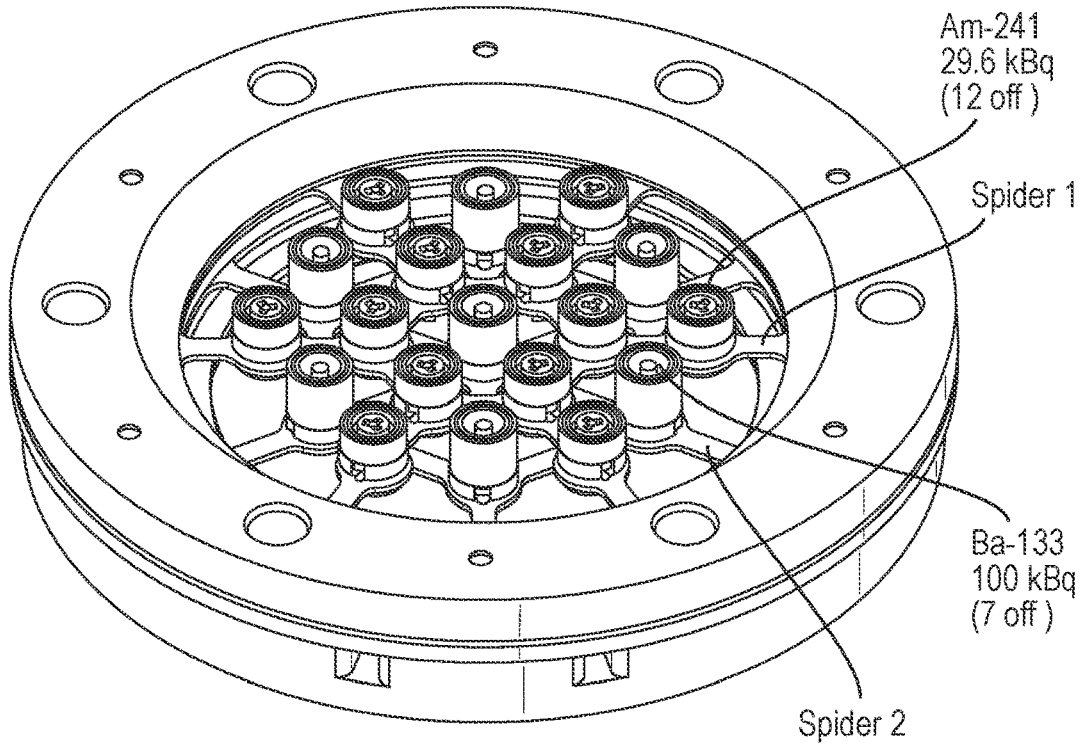
Figure 10C:
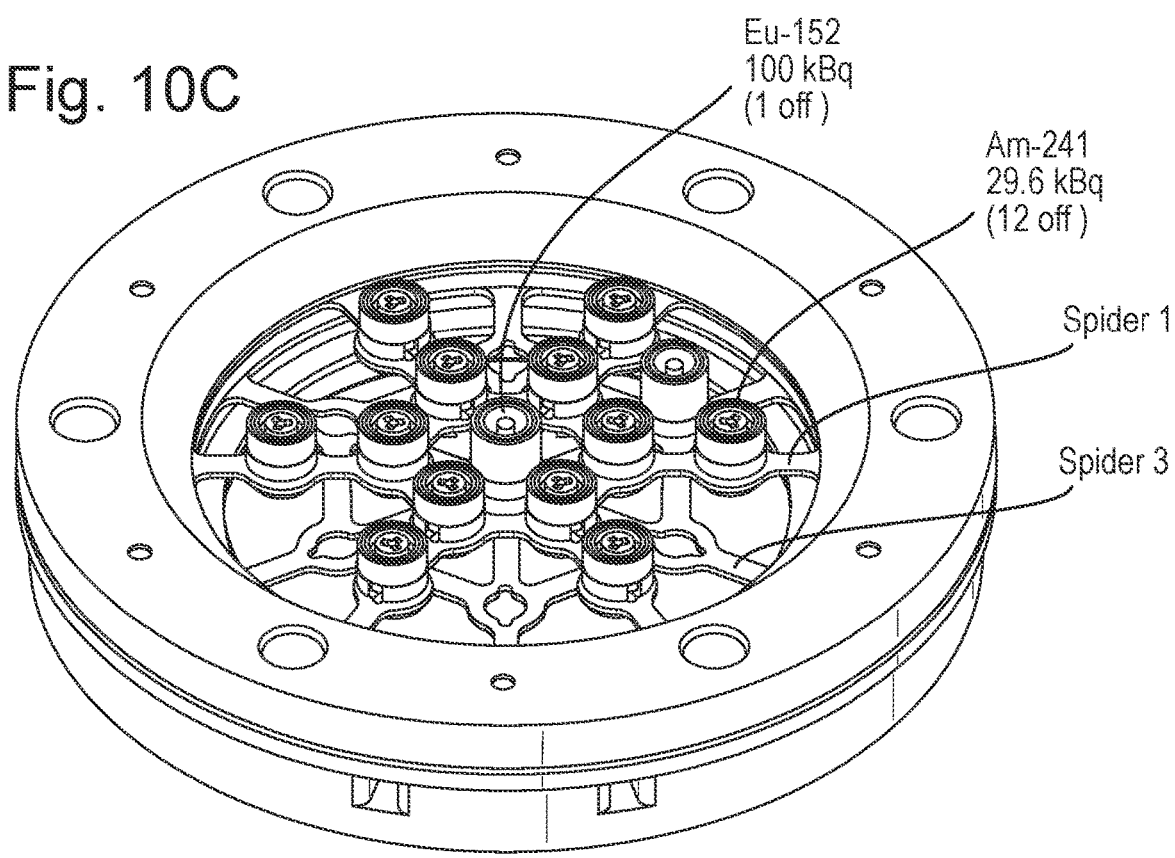
Figure 10D:
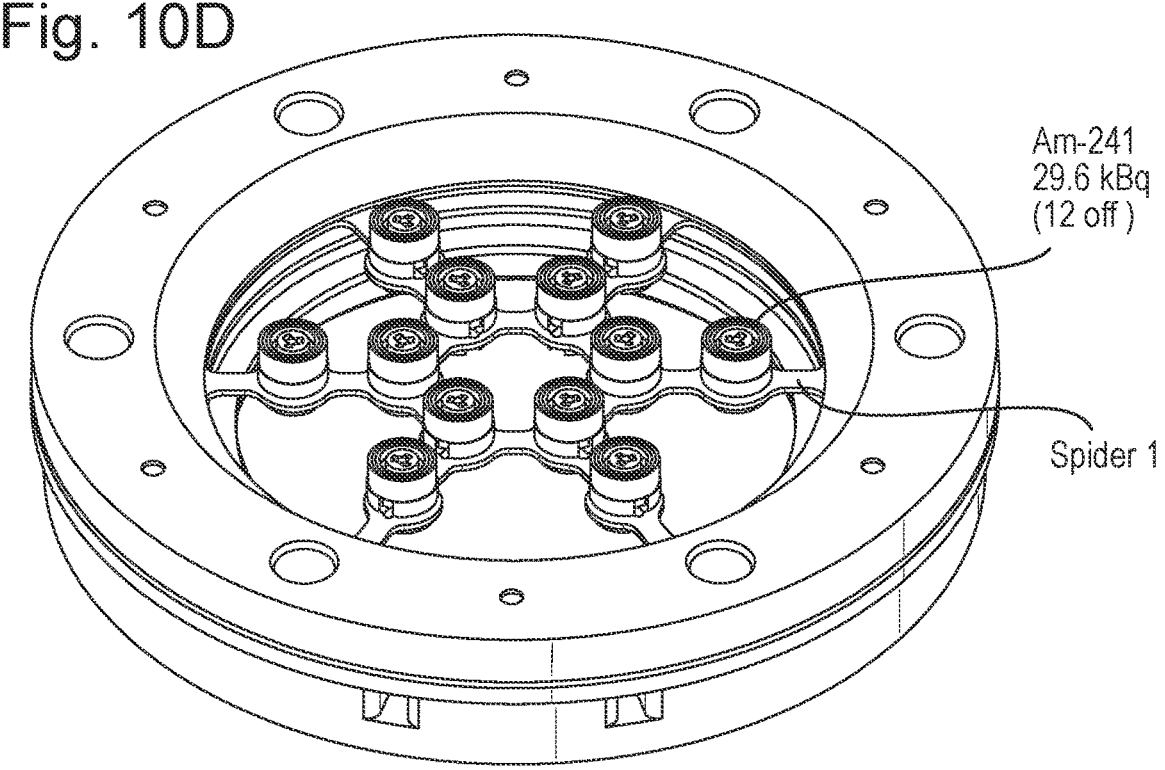
Figure 10E:
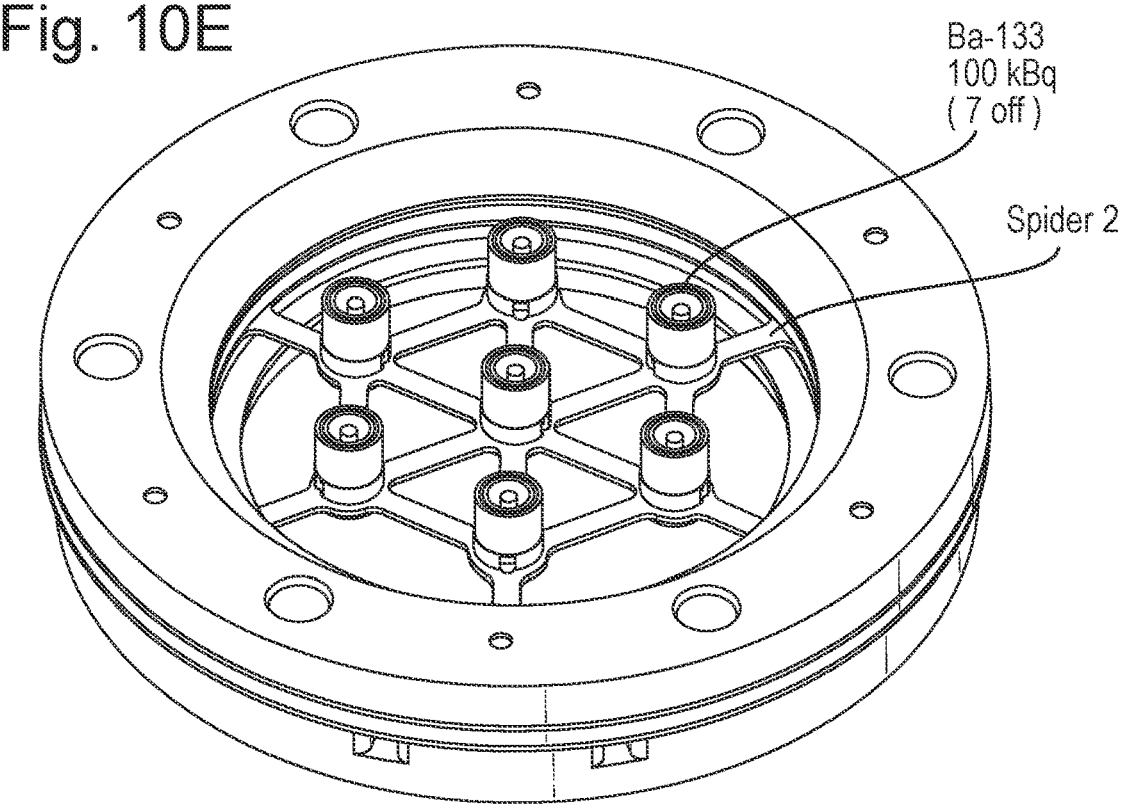
Figure 10F:
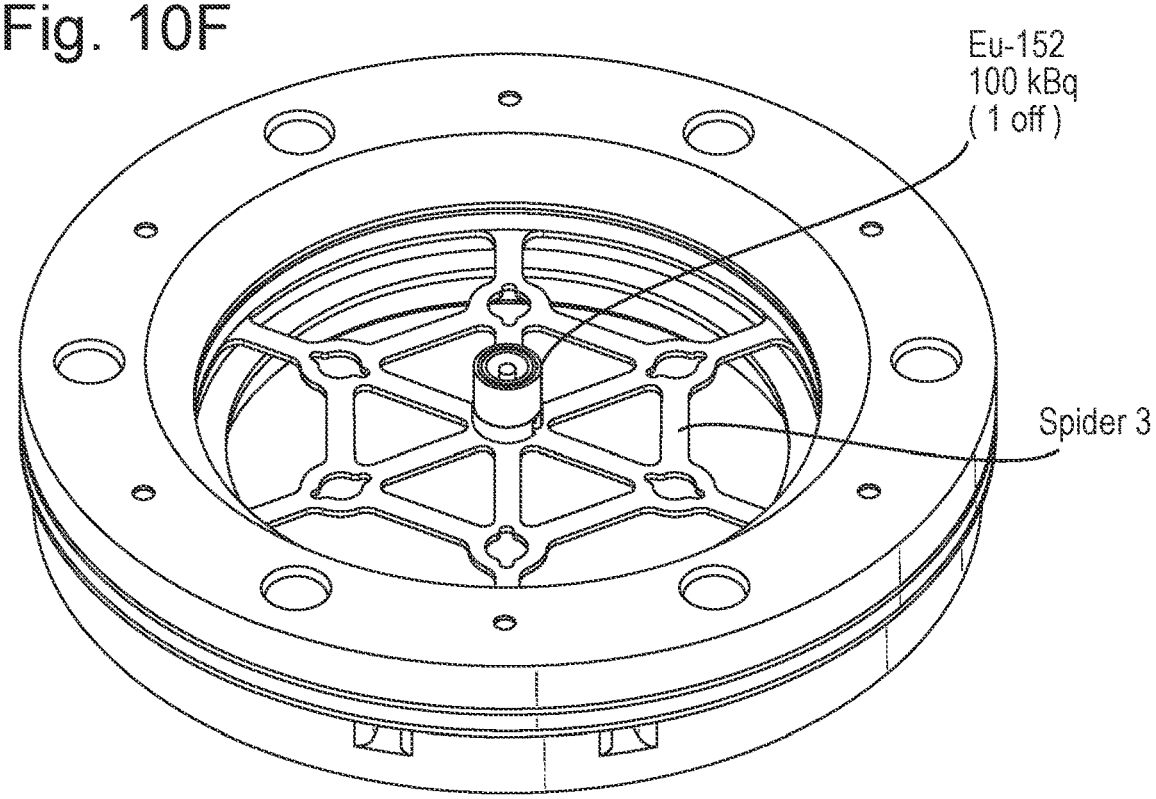

FIGS. 8A to 8C schematically depict the claim assembly of FIGS. 6A to 6C and FIGS. 7A to 7C, in more detail.

Particularly, FIG. 8A shows the section A-A of the clamp assembly 1 in more detail, FIG. 8B shows the section B-B of the clamp assembly 1 in more detail and FIG. 8C shows the section C-C of the clamp assembly 1 in more detail.

In more detail, gamma sources (i.e. included in articles 1000) are evenly distributed about the assembly A and comprise six 133Ba sources and one 152Eu source (i.e. mounted on clamp mount 20B) and twelve 241Am sources (i.e. mounted on clamp mount 20A). This configuration of sources reduces the rate at which gamma flux falls with distance r from the source plane. By comparison, the gamma flux of a single point source decreases at a rate of approximately 1/r. Measurements with a lead shield and aluminium supporting structure, as described below in relation to the Figures, have shown that the backscatter signal level from a target layer fell only by a factor 2 with every approximately 15.5 mm increase in range.

Regarding the sources, these are radioisotope sources which generate a number of discreet photon energies. For example Americium-241 (241Am) emits gamma at 59.54 keV and 26.34 keV as well as at a number of other discrete photon energies, although the branching ratio for emission of these other photon energies is negligible compared with the two lines quoted. The 133Ba sources provide higher gamma emission energies than the 241Am sources, for example 81 keV.

The gamma source array disposition might then include:
 ten sealed 241Am sources of activity 29.6 kBq (+/−20%)
 seven sealed 133Ba sources of activity 100 kBq (+20%/−10%), or sealed 152Eu sources of activity 100 kBq (+20%/−10%)

The 241Am sources are supplied by High Tech Sources Limited (part number AMMK7650) and the 133Ba is supplied by Ritverc GmbH (part number GBa3.11).

A further potential source for embodiments of the invention is Europium-152, in particular the 121.78 keV gamma emission line of Europium-152 (152Eu). Sealed 152Eu sources are also supplied by Ritverc GmbH (part number GEu2.11).

It has been noted that the 26.34 keV gamma line of 241Am has been found to be significantly attenuated by the materials found in a typical tablet or laptop and thus may not be ideal for embodiments of the invention, depending on the intended application. Preferred from this point of view might be the gamma ray emission lines emitted by Barium-133 (133Ba) or possibly Europium-152 (152Eu).

The radioactive half-lives of the three radio-isotopes 241Am, 133Ba and 152Eu vary considerably with values of 432.6 years, 10.51 years and 13.517 years, respectively. A recommended working lifetime for the 133Ba and 152Eu sources is 15 years. The impact of the relative variation in the activity of the source over time due to the significantly low half-life of either 133Ba or 152Eu on the resulting gamma backscatter spectra intensity may need to be compensated for computationally.

Although other isotopes of other elements might be found useful, only 241Am, 133Ba and 152Eu are currently proven to be useful for embodiments of the present invention. For example of the nineteen isotopes of Am, only three have significant lifetimes (all the rest have half-lives of less than a day), and only 241Am emits a useful gamma for the current application.

FIG. 9 is a photograph of a clamp assembly 1' according to an exemplary embodiment, manufactured according to FIGS. 1 to 8.

FIGS. 10A to 10F show alternative source dispositions, provided using the clamp assembly 1'.

Particularly, the clamp assembly A allows facilitates redisposition of sources, enhancing safety while providing accurate and/or precise holding thereof.

Although a preferred embodiment has been shown and described, it will be appreciated by those skilled in the art that various changes and modifications might be made without departing from the scope of the invention, as defined in the appended claims and as described above.

In summary, the invention provides a releasable clamp that more accurately and/or precisely holds articles or parts thereof, for example in desired or target dispositions. The releasable clamp comprises spacers and retaining members that act cooperatively in opposition via jaws that hold the articles or parts thereof therebetween and since these are designed thus, the articles are held reproducibly. In this way, the releasable clamp controls compressive forces applied to the articles or parts since the spacers limit the forces the forces applied thereon. In this way, the releasable clamp does not require a specialist tool to close and/or open. In this way, the releasable clamp simplifies and/or accelerates repeated opening and closing.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. A releasable clamp for holding an object, the clamp comprising:
 a set of jaws, including a first jaw and a second jaw, arrangeable to hold the object therebetween;
 a spacer arrangeable to space apart respective jaws of the set of jaws; and
 a retaining member arrangeable to space together respective jaws of the set of jaws;
 wherein the spacer and the retaining member are a monolithic single part;

wherein respective jaws of the set of jaws comprise a first region for contacting the object, a second region defining a portion of a part of a coupling member, a third region for contacting the spacer, and a fourth region for contacting the retaining member;

wherein the clamp is configurable in a first configuration and a second configuration;

wherein in the first configuration, the first jaw and the second jaw are mutually unjoined; and wherein in the second configuration, the spacer is arranged to space apart the first jaw and the second jaw and wherein the retaining member is arranged to apply a net compressive force on the spacer via the first jaw and the second jaw, whereby the first jaw and the second jaw are conjoined and thereby hold the object therebetween.

2. The clamp according to claim 1, wherein the spacer comprises or is a parallel-sided spacer, and wherein respective third regions are correspondingly shaped.

3. The clamp according to claim 1, wherein the retaining member is arranged to interlock around the first jaw and the second jaw.

4. The clamp according to claim 1, wherein the retaining member comprises or is a resiliently-biased retaining member.

5. The clamp according to claim 1, wherein the retaining member comprises a set of cylindrical bore regions, including a first bore region and a second bore region, for contacting correspondingly shaped fourth regions of the respective jaws.

6. The clamp according to claim 1, wherein each of the first jaw and the second jaw include a stem portion extending between relatively wider base and bowl portions, such that a distance between outer sidewalls of a respective stem portion is smaller than each of a distance between outer sidewalls of a respective bowl portion and a distance between outer sidewalls of a respective base portion, and wherein the bowl portions include the first region, the base portions include the second region, and the stem portions include the fourth region.

7. The clamp according to claim 5, wherein the spacer extends across at least a radius of the respective bore regions and/or wherein the first bore region and the second bore region are diametrically opposed.

8. The clamp according to claim 1, wherein the first region of a respective jaw of the set of jaws is proximal a first end thereof, the second region is proximal a second opposed end thereof, and the third region and the fourth region are therebetween.

9. The clamp according to claim 1, wherein the part of the coupling member comprises or is a male coupling member.

10. The clamp according to claim 1, wherein the first jaw and the second jaw are mutually paired.

11. A clamp assembly comprising:
a releasable clamp according to claim 1, wherein the part of the coupling member is a first part of the coupling member; and
a clamp mount, comprising a corresponding second part of the coupling member;
wherein the clamp assembly is arrangeable in a first arrangement and a second arrangement;
wherein in the first arrangement, the releasable clamp and the clamp mount are mutually uncoupled; and
wherein in the second arrangement, respective portions of the first part of the coupling member of the set of jaws are coupled with the corresponding second part of the coupling member, if the releasable clamp is configured in the second configuration.

12. The clamp assembly according to claim 11, wherein the corresponding second part of the coupling member comprises or is a female coupling member.

13. The clamp assembly according to claim 11, comprising a set of releasable clamps and/or wherein the clamp mount comprises a set of corresponding second parts of respective coupling members.

14. The clamp assembly according to claim 11, comprising a set of clamp mounts, wherein respective clamp mounts of the set of clamp mounts are arrangeable in a stack.

15. The clamp according to claim 1, wherein the object comprises a source of ionizing radiation.

16. The clamp according to claim 2, wherein the parallel-sided spacer is a parallel key or a tapered key, and wherein respective third regions are correspondingly shaped.

17. A releasable clamp for holding an article, the clamp comprising:
a first jaw and a second jaw, arrangeable to hold the article therebetween;
a spacer, arrangeable to space apart the first and second jaws; and
a retaining member, arrangeable to space together the first and second jaws;
wherein the spacer and the retaining member are a monolithic single part;
wherein the first and second jaws comprise a first region for contacting the article, a second region for contacting the spacer and a third region for contacting the retaining member;
wherein the clamp is configurable in a first configuration and a second configuration;
wherein in the first configuration, the first jaw and the second jaw are mutually unjoined; and
wherein in the second configuration, the spacer is arranged to space apart the first jaw and the second jaw and wherein the retaining member is arranged to apply a net compressive force on the spacer via the first jaw and the second jaw, whereby the first jaw and the second jaw are conjoined and thereby hold the article therebetween.

18. The clamp according to claim 17, wherein the retaining member comprises or is a resiliently-biased retaining member.

19. A releasable clamp for holding an object, the clamp comprising:
a set of jaws, including a first jaw and a second jaw, arrangeable to hold the object therebetween, wherein each of the first jaw and the second jaw has a goblet-shaped profile that includes a stem portion extending between a base portion and a bowl portion, the first jaw and the second jaw each having an axial centerline that extends between the base portion and the bowl portion, wherein the base portion and the bowl portion are wider than the stem portion in a radial direction extending perpendicularly from the centerline;
wherein surfaces most radially extant from and parallel to the centerline define an outer sidewall of each of the first jaw and the second jaw;
a spacer arrangeable to space apart the first jaw and the second jaw; and
a retaining member arrangeable to space together the first jaw and the second jaw;
wherein the bowl portion of each of the first jaw and the second jaw comprises a region for contacting the object, and wherein the stem portion of each of the first jaw and the second jaw comprises a region for contacting the retaining member;

wherein the clamp is configurable in a first configuration and a second configuration;

wherein in the first configuration, the first jaw and the second jaw are mutually unjoined; and wherein in the second configuration, the spacer is arranged to space apart the first jaw and the second jaw and wherein the retaining member is arranged to apply a net compressive force on the spacer via the first jaw and the second jaw, whereby the first jaw and the second jaw are conjoined and thereby hold the object therebetween;

wherein in the first or second configuration, a distance between the outer sidewall of the stem portion of the first jaw and the outer sidewall of the stem portion of the second jaw is smaller than each of: a distance between the outer sidewall of the bowl portion of the first jaw and the outer sidewall of the bowl portion of the second jaw, and a distance between the outer sidewall of the base portion of the first jaw and the outer sidewall of the base portion of the second jaw.

20. The clamp according to claim 19, wherein the base portion of each of the first jaw and the second jaw comprises a region defining a part of a male coupling member.

* * * * *